United States Patent
Itoh et al.

(10) Patent No.: US 8,483,278 B2
(45) Date of Patent: *Jul. 9, 2013

(54) METHOD OF SEARCHING FOR MOTION VECTOR, METHOD OF GENERATING FRAME INTERPOLATION IMAGE AND DISPLAY SYSTEM

(75) Inventors: Goh Itoh, Tokyo (JP); Nao Mishima, Yokohama (JP); Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1141 days.

This patent is subject to a terminal disclaimer.

(21) Appl. No.: 12/410,185

(22) Filed: Mar. 24, 2009

(65) Prior Publication Data

US 2009/0185622 A1 Jul. 23, 2009

Related U.S. Application Data

(62) Division of application No. 10/658,539, filed on Sep. 10, 2003, now Pat. No. 7,561,621.

(30) Foreign Application Priority Data

Sep. 12, 2002 (JP) ................................. 2002-266642

(51) Int. Cl.
*H04N 7/12* (2006.01)

(52) U.S. Cl.
USPC ..................................................... 375/240.16

(58) Field of Classification Search
USPC .............. 375/240.01, 240.16, 240.24, 240.26
IPC ........................................................ H04N 7/12
See application file for complete search history.

(56) References Cited

U.S. PATENT DOCUMENTS 6,594,313 B1    7/2003    Hazra et al.

FOREIGN PATENT DOCUMENTS

| JP | 63-105587 | 5/1988 |
|---|---|---|
| JP | 3-99591 | 4/1991 |
| JP | 5-49017 | 2/1993 |
| JP | 8-298665 | 11/1996 |
| JP | 10-145792 | 5/1998 |
| JP | 2000-224593 | 8/2000 |
| JP | 2001-25021 | 1/2001 |
| JP | 2001-61152 | 3/2001 |

*Primary Examiner* — Young Lee

(74) *Attorney, Agent, or Firm* — Oblon, Spivak, McClelland, Maier & Neustadt, L.L.P.

(57) ABSTRACT

A motion vector detection method includes extracting a first block including a plurality of pixels from a first frame of the image, detecting a second block from a plurality of blocks of a second frame of the image by block matching, the second block including the maximum number of pixels each indicating an absolute difference value not more than a first threshold with respect to each of the pixels of the first block, and computing a first motion vector between the first block and the second block.

2 Claims, 23 Drawing Sheets

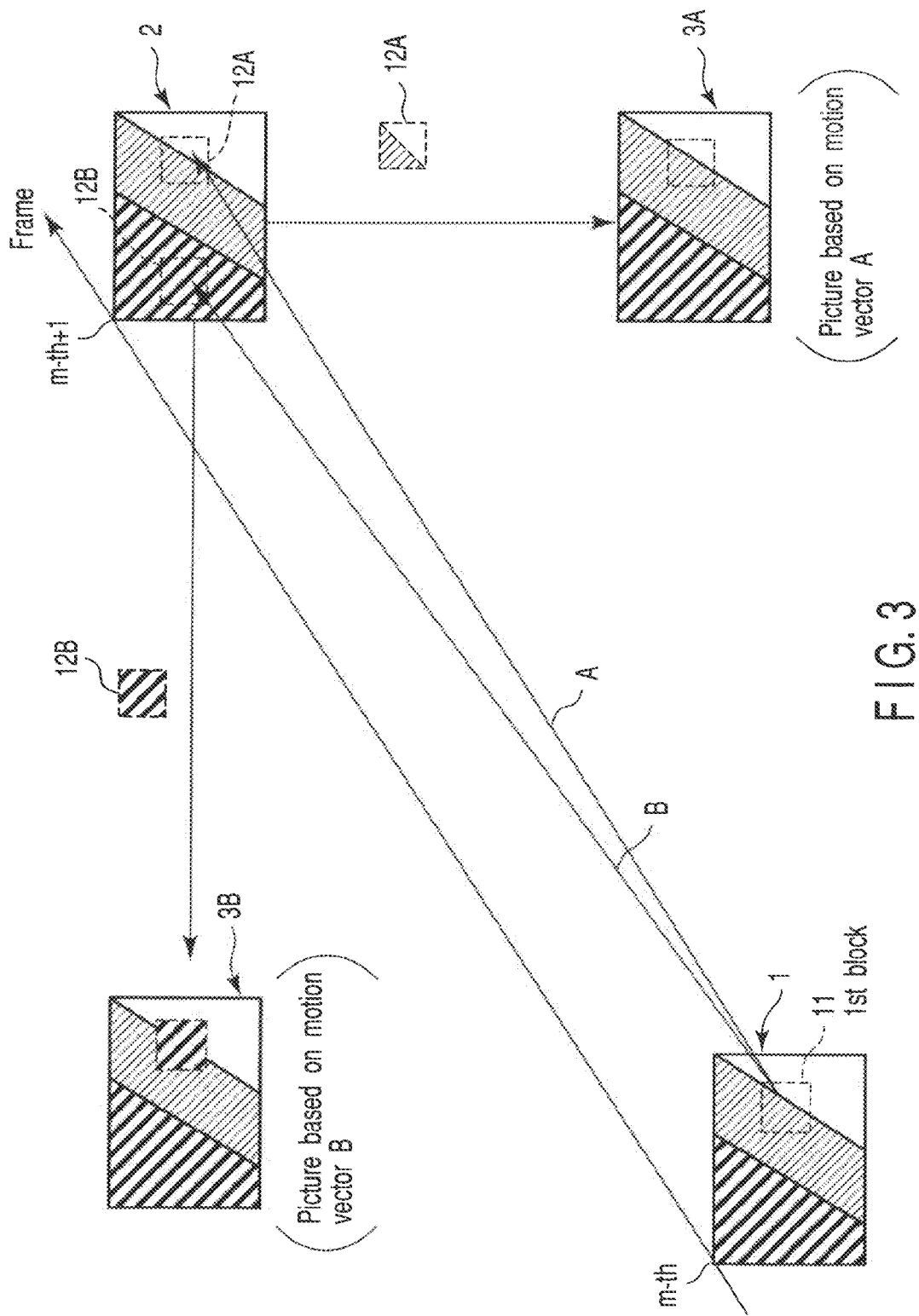
F I G. 3

|  |  |  |
|---|---|---|
| 100 | 100 | 60 |
| 100 | 60 | 60 |
| 60 | 60 | 60 |

FIG. 4A

|  |  |  |
|---|---|---|
| 120 | 120 | 80 |
| 120 | 80 | 80 |
| 80 | 80 | 80 |

FIG. 4B

|  |  |  |
|---|---|---|
| 70 | 70 | 70 |
| 70 | 70 | 70 |
| 70 | 70 | 70 |

FIG. 4C

|  |  |  |
|---|---|---|
| 20 | 20 | 20 |
| 20 | 20 | 20 |
| 20 | 20 | 20 |

Sum of absolute differences = 180

FIG. 4D

|  |  |  |
|---|---|---|
| 30 | 30 | 10 |
| 30 | 10 | 10 |
| 10 | 10 | 10 |

Sum of absolute differences = 150

FIG. 4E

| 100 | 100 | 60 |
|---|---|---|
| 100 | 60 | 60 |
| 60 | 60 | 60 |

FIG. 5A

| 120 | 120 | 80 |
|---|---|---|
| 120 | 80 | 80 |
| 80 | 80 | 80 |

FIG. 5B

| 70 | 70 | 70 |
|---|---|---|
| 70 | 70 | 70 |
| 70 | 70 | 70 |

FIG. 5C

| 20 | 20 | 20 |
|---|---|---|
| 20 | 20 | 20 |
| 20 | 20 | 20 |

The number of pixels not more than threshold = 9

FIG. 5D

|  |  | 10 |
|---|---|---|
|  | 10 | 10 |
| 10 | 10 | 10 |

The number of pixels not more than threshold = 6

FIG. 5E

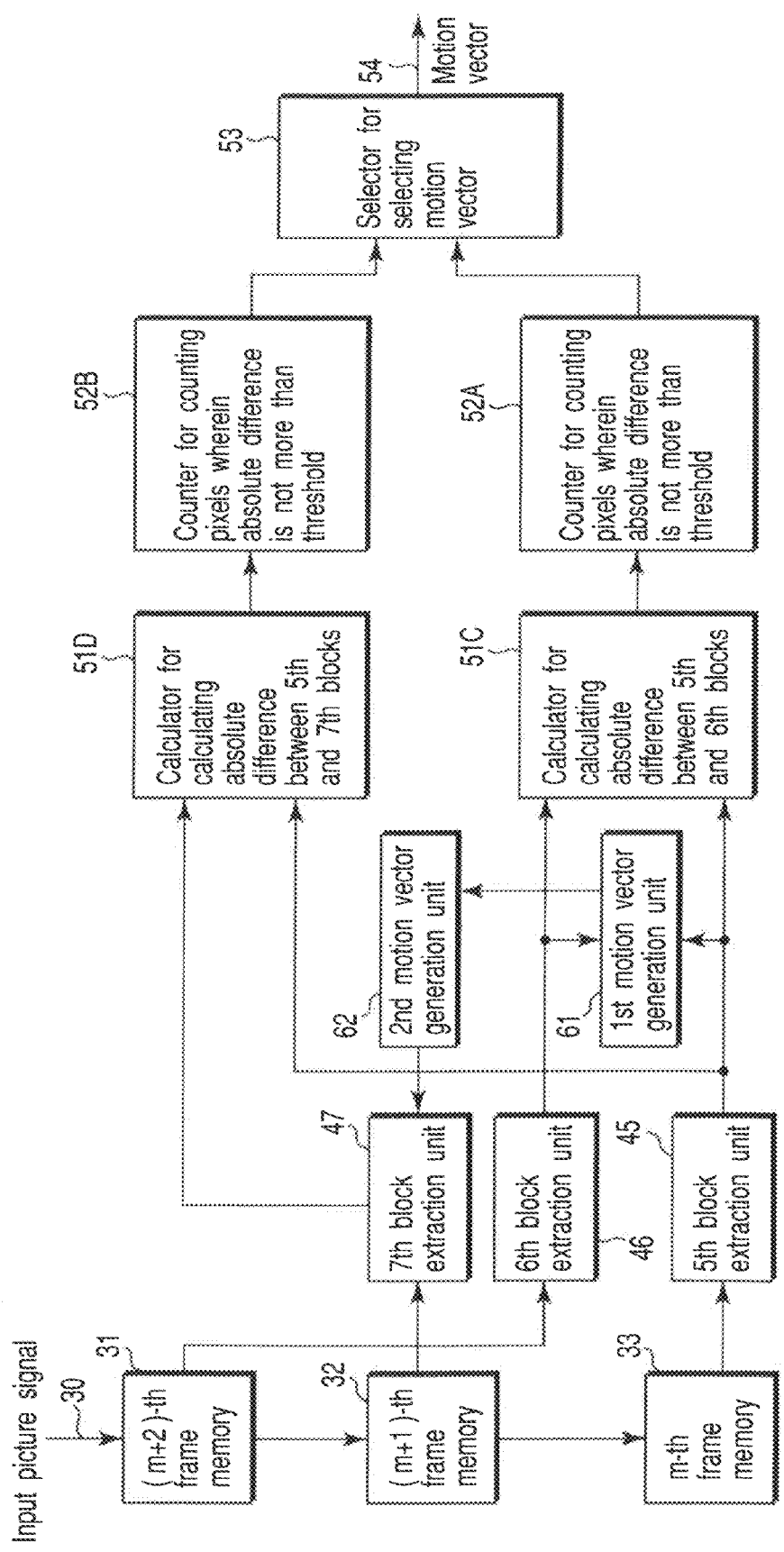
F I G. 14

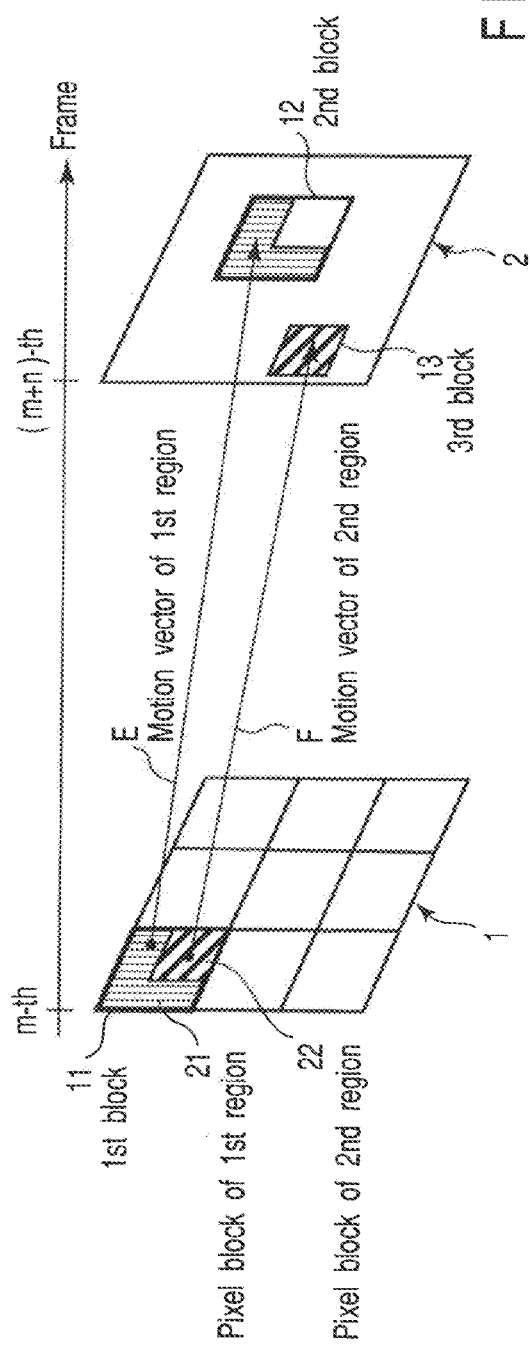
F I G. 15
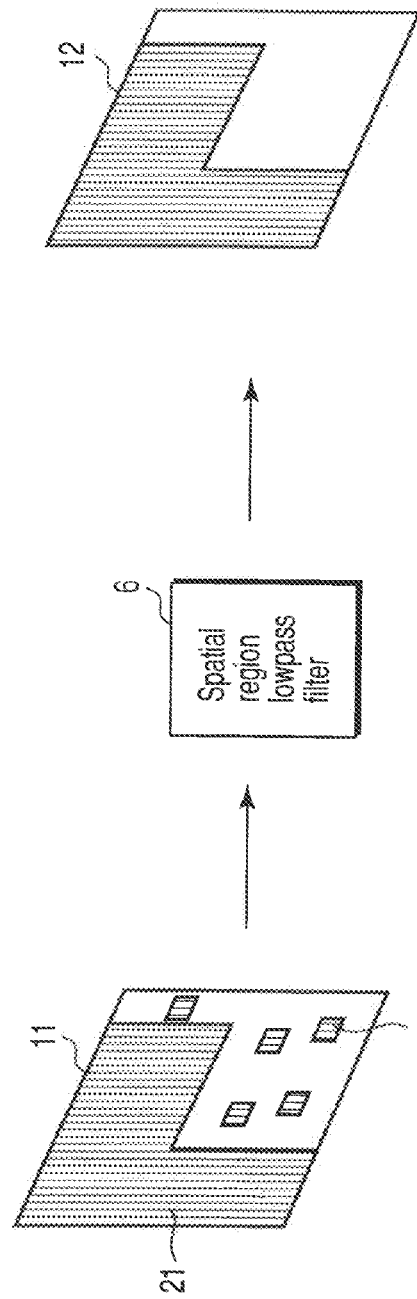
F I G. 19

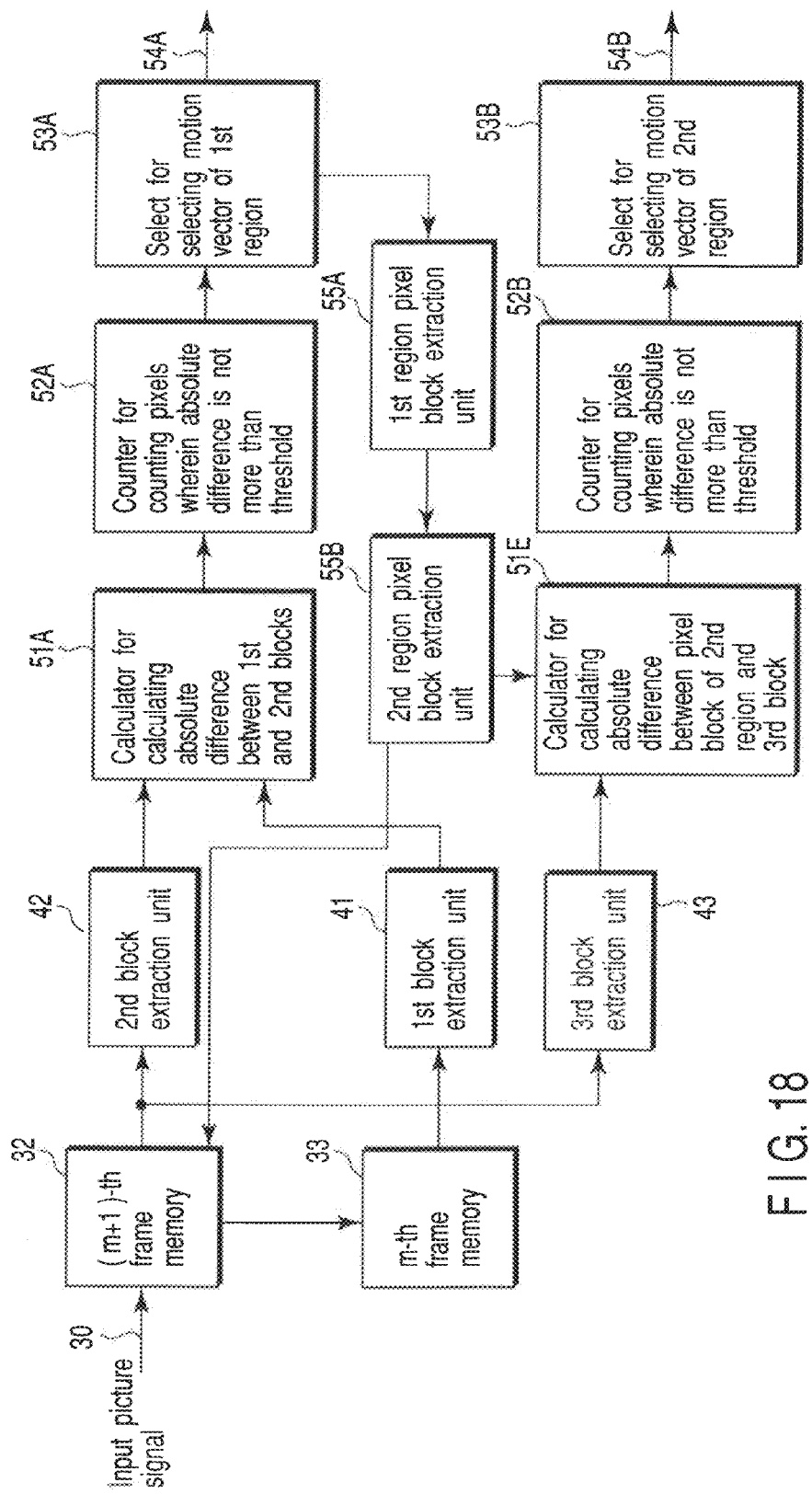
F I G. 18

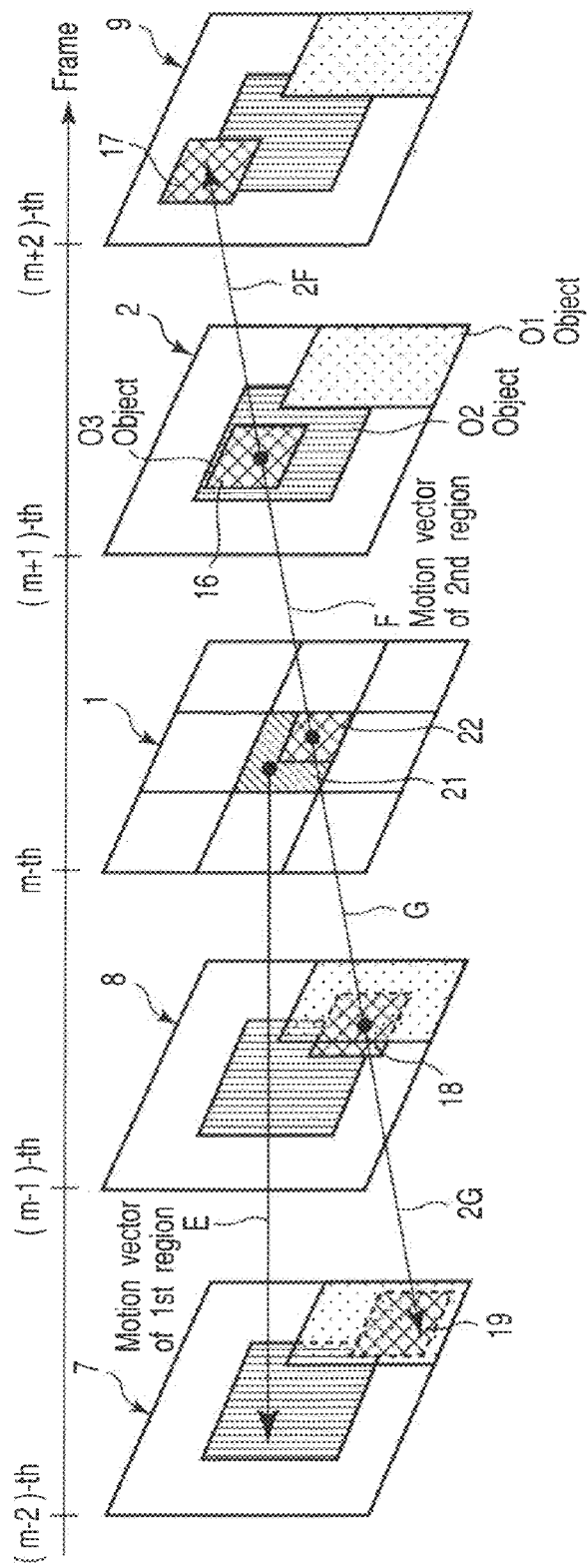
F I G. 22

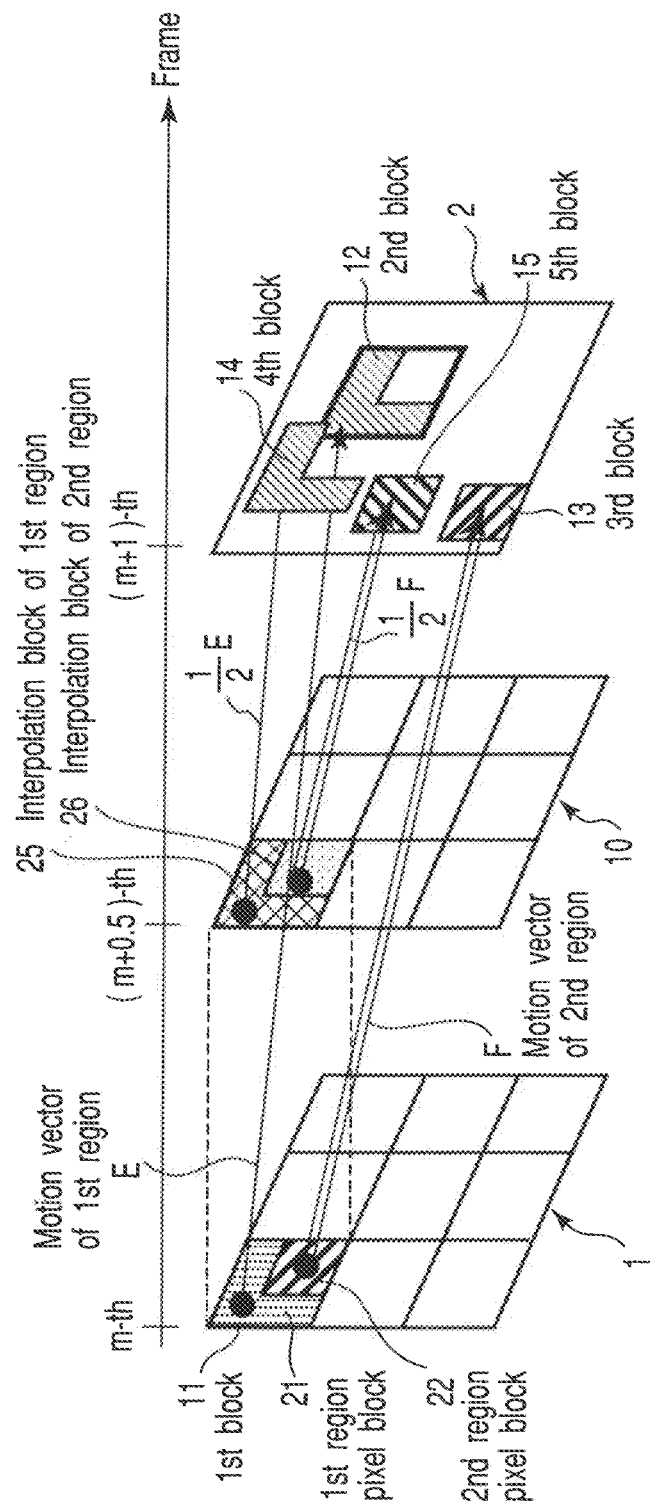
F I G. 24

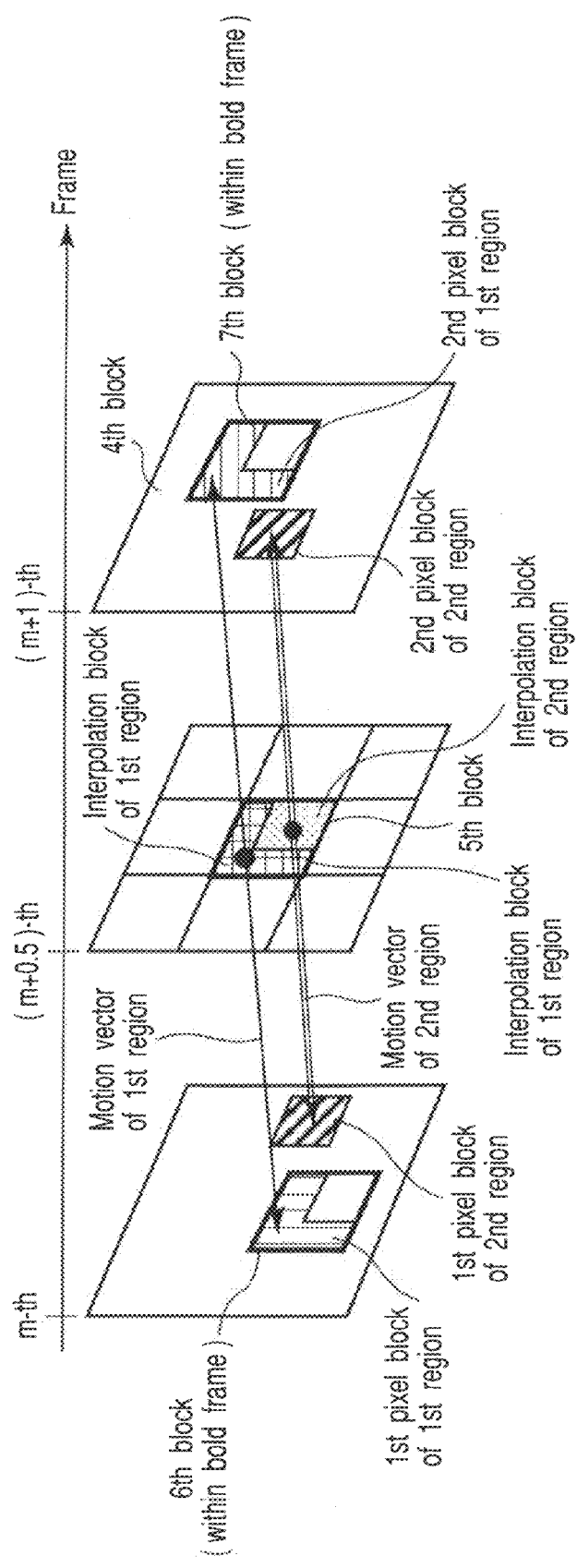
F I G. 26

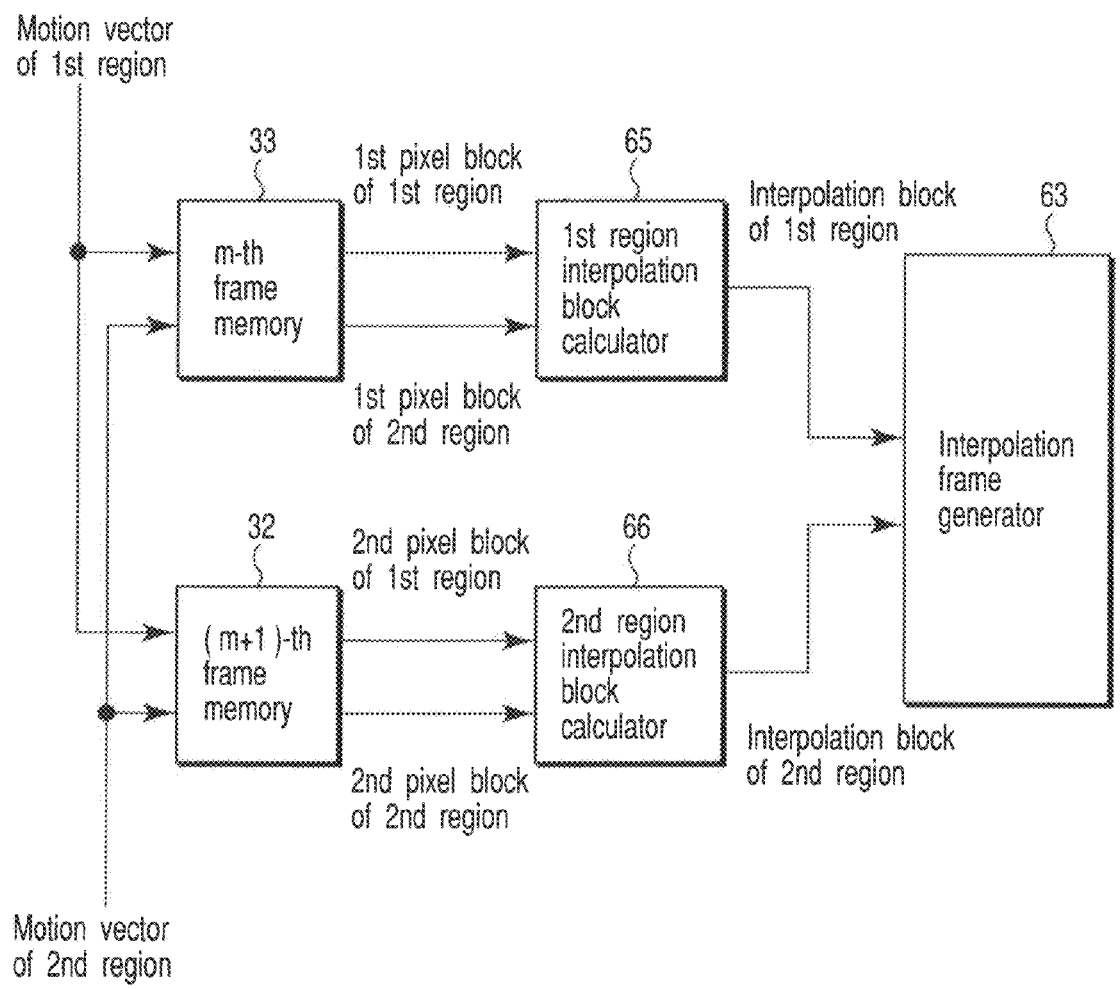
F I G. 30

METHOD OF SEARCHING FOR MOTION VECTOR, METHOD OF GENERATING FRAME INTERPOLATION IMAGE AND DISPLAY SYSTEM

CROSS-REFERENCE TO RELATED APPLICATIONS

This application is a division of and claims the benefit of priority under 35 U.S.C. §120 from U.S. Ser. No. 10/658,539 filed Sep. 10, 2003, and claims the benefit of priority under 35 U.S.C. §119 from Japanese Patent Application No. 2002-266642 filed Sep. 12, 2002, the entire contents of each of which are incorporated herein by reference.

BACKGROUND OF THE INVENTION

1. Field of the Invention

The present invention relates to a method of searching for a motion vector, a method of generating a frame interpolation image by motion compensation using the motion vector, and a display system.

2. Description of the Related Art

Generally, there is two kinds of display units, one is an impulse type display unit that continues emitting light only by afterglow of a fluorescent substance after writing of an image, for example, CRT or field emission type display unit (FED), and the other is a hold type display unit that continues holding display of a previous frame till a new image is written, for example, Liquid Crystal Display (LCD) and Electro Luminescence Display (ELD).

A problem of the hold type display unit is a blur phenomenon occurring in a motion video display. The occurrence of the blur phenomenon appears a moving object over a plurality of frames. When the eyes of a viewer follow movement of the moving object, the images of a plurality of frames are overlapped and projected on the retina. The image of the same previous frame is continuously displayed while a display image is replaced from a previous frame to a next frame. In spite of this, the viewer predicts the image of the next frame, and observes the moving object while moving the eyes on the previous frame image in a moving direction of the moving object. In other words, since the following motion of the eyes has continuity and the eyes samples the image at a finer distance than the distance between frames, the viewer recognizes visually the image to interpolate adjacent frames. Therefore, the moving body is observed in blur.

Another problem of the hold type display unit is to occur unnatural movement when a motion video of few frames is displayed.

A display frame distance may be shorten to solve these problems. As a concrete technique it is considered to interpolate adjacent frames using a motion compensation used in MPEG (Motion Picture Experts Group phase2) to form an interpolation image. In the motion compensation, a motion vector detected by block matching is used. However, since MPEG2 makes an image in units of a block, correlated blocks and uncorrelated blocks occur in the block. For this reason, a block distortion occurs due to uncorrelated blocks.

Japanese Patent Laid-Open No. 2000-224593 discloses an interframe interpolation method for solving this problem. According to this prior method, when the pixel value of an interpolation block in an interpolation frame is determined, the absolute difference value between two frames is compared with the threshold every corresponding pixel with respect to a to-be-decoded block. The blocks are classified into a first pixel region having an absolute difference value not more than the threshold and a second pixel region having an absolute difference value higher than threshold. In the first pixel region, an average of a pixel value of the first pixel region and a corresponding pixel value within a reference block designated by a motion vector between two frames is calculated to form an interpolation frame. In the second pixel region, a hidden surface relation in a to-be-decoded frame is determined, and a motion vector search direction between two frames is again set to detect a second motion vector. When a motion vector obtained by scaling the second motion vector designates a block, a pixel value in the search reference frame is copied to an interpolation frame.

It is an object of the present invention to provide a motion vector detection method suitable for creation of an interpolation image, a frame interpolation image making method using this method and a display system.

BRIEF SUMMARY OF THE INVENTION

According to an aspect of the invention, there is provided a method of detecting a motion vector between a plurality of frames of an image, the frames each including a plurality of blocks, the method comprising: extracting a first block including a plurality of pixels from a first frame of the image; detecting a second block from a plurality of blocks of a second frame of the image by block matching, the second block including the maximum number of pixels each indicating an absolute difference value not more than a first threshold with respect to each of the pixels of the first block; and computing a first motion vector between the first block and the second block.

BRIEF DESCRIPTION OF THE SEVERAL VIEWS OF THE DRAWING

FIG. 3 shows an image output result and an effect thereof according to the embodiment;

FIGS. 4A to 4E show diagrams for explaining an error detection of the motion vector.

FIGS. 5A to 5E show diagrams for explaining a determination method of a block detected by the method of the embodiment.

FIG. 14 is a block diagram that shows constitution of a motion vector detection apparatus according to the embodiment.

FIG. 15 is a diagram for explaining a region division and a motion vector detection method that are related to a fifth embodiment of the present invention.

FIG. 18 is a block diagram showing a configuration of a region division and motion vector detection apparatus according to the embodiment.

FIG. 19 is a diagram of explaining a region division and motion vector detection method according to the sixth embodiment of the present invention.

FIG. 22 is a diagram of explaining a region division and motion vector detection method related to the ninth embodiment of the present invention.

FIG. 24 is a diagram of explaining a region division and motion vector detection method according to the eleventh embodiment of the present invention.

FIG. 26 is a diagram of explaining a region division and motion vector detection method according to the twelfth embodiment of the present invention.

FIG. 30 is a block diagram showing a configuration of an interpolation image forming apparatus according to the embodiment.

DETAILED DESCRIPTION OF THE INVENTION

Figure 1:
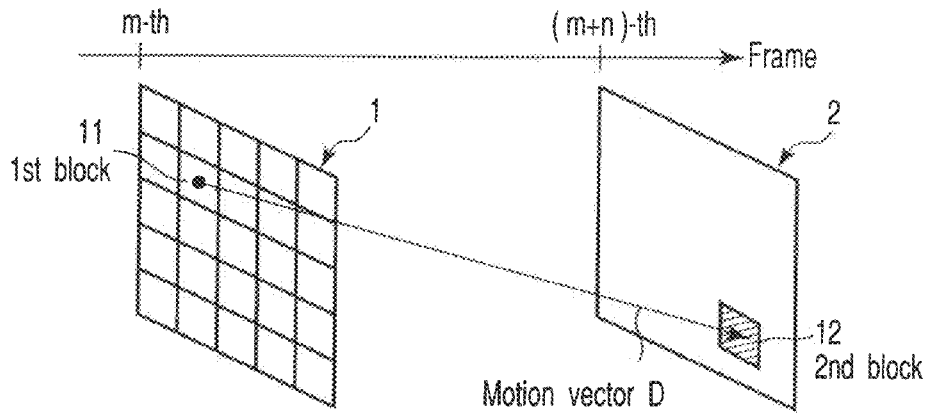
FIG. 1 is a diagram for explaining a motion vector detection method related to the first embodiment of the present invention.

There will now be described embodiments of the present invention referring to the drawings.

(First Embodiment)

Figure 2:
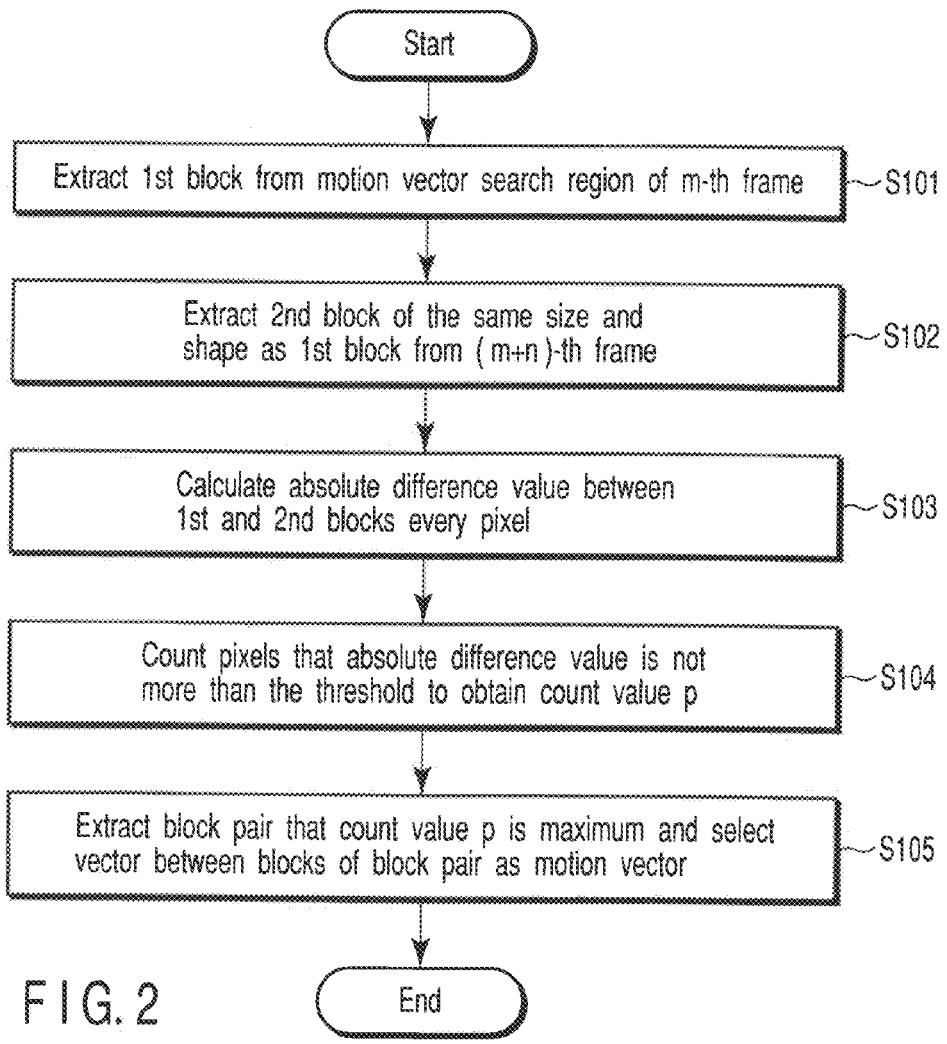
FIG. 2 is a flow chart that shows a motion vector detection procedure according to the embodiment.

A procedure shown in FIG. 2 is used in the first embodiment of the present invention to detect a motion vector between the m-th frame (m is integer) 1 and (m+n)-th frame (n is an integer not less than 1) 2 of an original video as shown in FIG. 1. The procedure of the present embodiment is described in conjunction with FIGS. 1 and 2 hereinafter.

At first, the image data of the m-th frame 1 is divided into a plurality of first blocks 11, and the first blocks 11 are extracted sequentially (step S101).

The second block 12 of the same size and shape as the first block 11 extracted in step S101 is extracted from the image data of the (m+n)-th frame 2 (step S102).

The absolute difference value of the corresponding pixels of the first block 11 extracted in step S101 and the second block 12 extracted in step S102 is computed every pixel (step S103). Therefore, the number of differential absolute values is equal to the number of pixels in a block.

Each absolute difference value is compared with a common threshold, and the pixels that the absolute difference value is not more than the threshold are counted to obtain a count value p (p is an integer not less than 0) (step S104).

A pair of first and second blocks 11 and 12 that the count value p obtained in step S104 is maximum are acquired every first block 11 extracted in step S101, and a vector to connect between the blocks is selected as a motion vector (step S105). In other words, a pair of blocks each including the maximum number of pixels that the absolute difference is not more than the threshold are obtained by block matching. A motion vector between the pair of blocks is detected.

FIG. 3 shows a state that an interpolation image varies by a detection result of a motion vector. When a motion vector detected with respect to the first block 11 is A, the image 3A is made by the second block 12A designated by the motion vector A. When a motion vector detected with respect to the first block 11 is B, the image 3B is made by the second block 12B designated by the motion vector B. In this example, the motion vector A is right, and the motion vector B is wrong.

Because in making an interpolation image the interpolation image is made at a position at which no original picture exists, image quality of the interpolation image is approximately determined by precision of the motion vector. When a wrong motion vector B is detected as shown in FIG. 3, the quality of the interpolation image is largely deteriorated as shown by an image 3B.

FIG. 4 shows an example of image data corresponding to FIG. 3. The motion vectors A and B shown in FIG. 3 are detected with respect to the first block 11 of the m-th frame 1 shown in FIG. 4A. Assuming that the second block 12A and 12B designated by the motion vectors A and B are extracted from the (m+n)-th frame 2 as shown in FIGS. 4B and 4C.

As shown in FIG. 4A, the image of the (m+n)-th frame 2 slightly varies in brightness. It is important that the second block 12A designated by the correct motion vector A becomes bright on the whole with respect to 4A as shown in FIG. 4B, but it does not vary in shape. On the other hand, the second block 12B designated by the wrong motion vector B is the whole raster picture as shown in FIG. 4C, and is different in shape itself from FIG. 4A.

The block matching method used in MPEG2 provides the sum of the absolute difference values of pixel values of a pair of first and second blocks. In other words, the sum of the absolute difference values of pixel values of FIGS. 4A and 4B and the sum of the absolute difference values of pixel values of FIGS. 4A and 4C (referred to an absolute difference value sum) are obtained respectively. The absolute difference value sum of FIGS. 4A and 4B is "180" as shown in FIG. 4D. In contrast, the absolute difference value sum of FIGS. 4A and 4C is "150" as shown in FIG. 4E. Assuming that the small absolute difference value sum is selected, a pair of blocks shown in FIGS. 4A and 4C are selected, and the corresponding motion vector B is selected. However, when correlation is determined from the shape of edges, a pair of blocks having higher correlation is a pair of blocks of FIGS. 4A and 4B.

FIGS. 5A-5E show an example of image data corresponding to FIG. 3 in accordance with the present embodiment. FIGS. 5A, 5B and 5C is the same as FIGS. 4A, 4B and 4C. In accordance with the present embodiment, the threshold is set to, for example, "20", and pixels that the absolute difference value of opposite pixels of the first and second blocks is not more than the threshold are counted to obtain a count value p. In this case, the count value of pixels that the sum of absolute difference values between the first block 11 of FIG. 5A and the second block 12A of FIG. 5B which is designated by the motion vector A is not more than the threshold is "9". The count value of pixels that the sum of absolute difference values between the first block 11 of FIG. 5A and the second block 12B of FIG. 5C which is designated by the motion vector B is not more than the threshold is "6".

According to the present embodiment, a motion vector between the blocks of the block pair that the count value p is larger is selected. That is, the motion vector A between the blocks of the block pair of FIGS. 5A and 5B is selected. It is ensured by the experiment of inventors that an error detection of a wrong motion vector is decreased by setting the threshold to become around 3% of the average pixel value (brightness value) of an image. An effect is ensured by setting the threshold to 5 levels in an image of 256 gray levels, for example.

Figure 6:
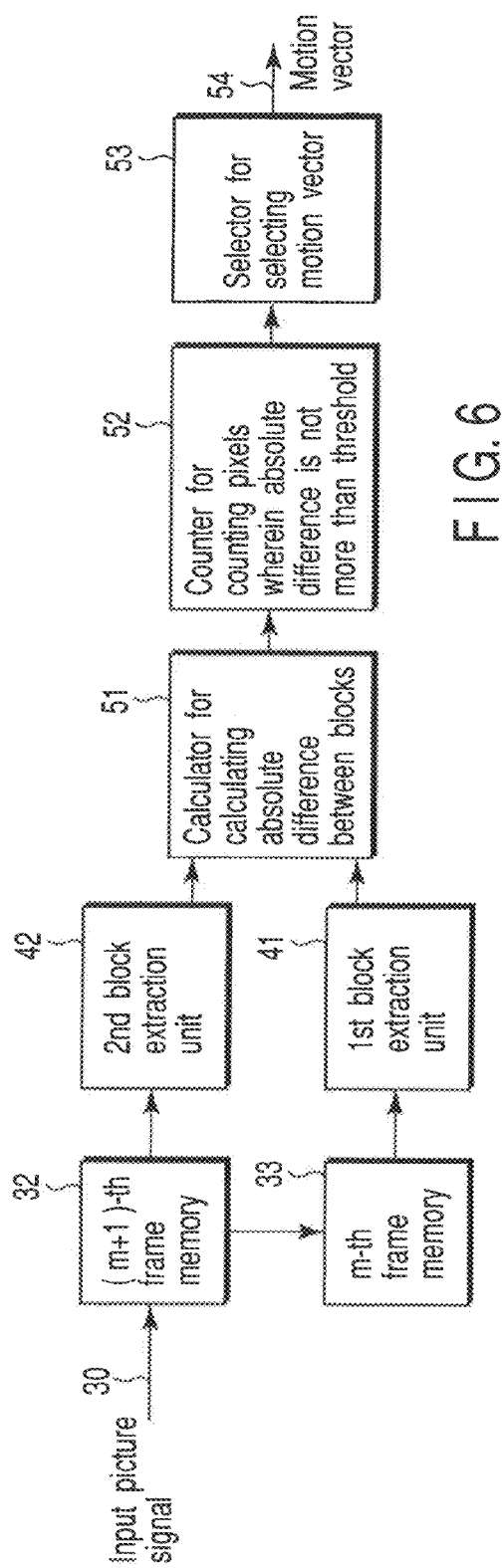
FIG. 6 is a block diagram that shows a configuration of a motion vector detection apparatus according to the embodiment.

The configuration of a motion vector detection apparatus for executing the motion vector detection process related to the present embodiment is shown in FIG. 6. Assuming that n=1 in order to simplify explanation. An input image signal 31 is input to an (m+1)-th frame memory 32 and an m-th frame memory 33 sequentially. The image signals 34 and 35 of the (m+1)-th frame and m-th frame are read out from the frame memories 32 and 33 respectively.

The first block extraction unit 41 executes the process of step S101 in FIG. 2, that is, extraction of the first block from the m-th frame. The second block extraction unit 42 executes a process of step S102, that is, extraction of the second block from the (m+1)-th frame. The image signals of the first and second blocks are input to the absolute difference calculation unit 51. The process of step S103, that is, the computation for the absolute difference value E1 between the opposite pixels is done. The absolute difference value E1 is calculated by the following equation:

$$E1=|f(X+D,m+n)-f(X,m)| \quad (1)$$

Where D expresses a motion vector, X expresses a position vector of a block, and f (X, m) expresses pixel data corresponding to the position (X) of each block and a frame (m). These parameters are used in another embodiment to be described below.

The absolute difference value E1 obtained by an absolute difference calculation unit 51 is input to a counter unit 52 for counting pixels that the absolute difference value E1 is not more than the threshold. In step S104 the absolute difference value E1 is compared with the threshold. The calculation for obtaining the count value p of pixels that the absolute difference value E1 is not more than the threshold is done every block pair of the first and second blocks. The count value p is input to a motion vector selection unit 53. In step S105, a pair of blocks that the count value p is maximum are extracted, and a motion vector is detected and selected.

As described above, the present embodiment can detect a motion vector with emphasis on a shape between the m-th and (m+n)-th frames.

(Second Embodiment)

Figure 7:
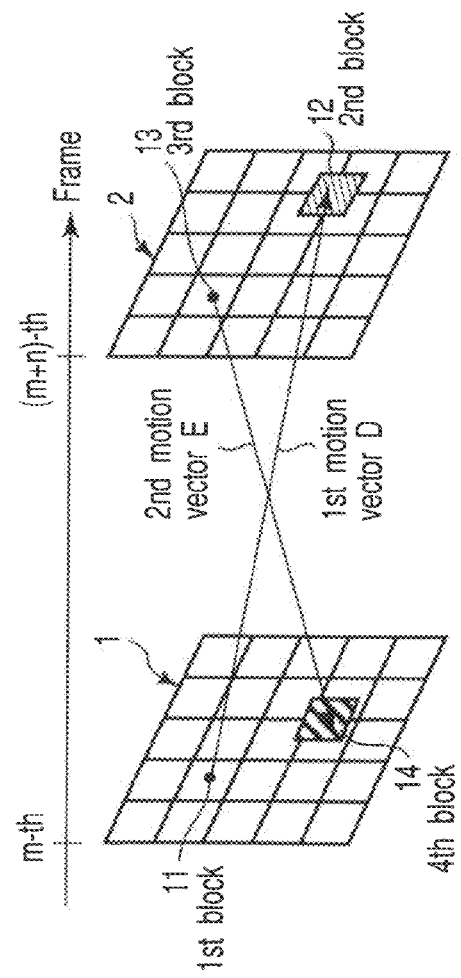
FIG. 7 is a diagram for explaining a motion vector detection method related to a second embodiment of the present invention.
Figure 8:
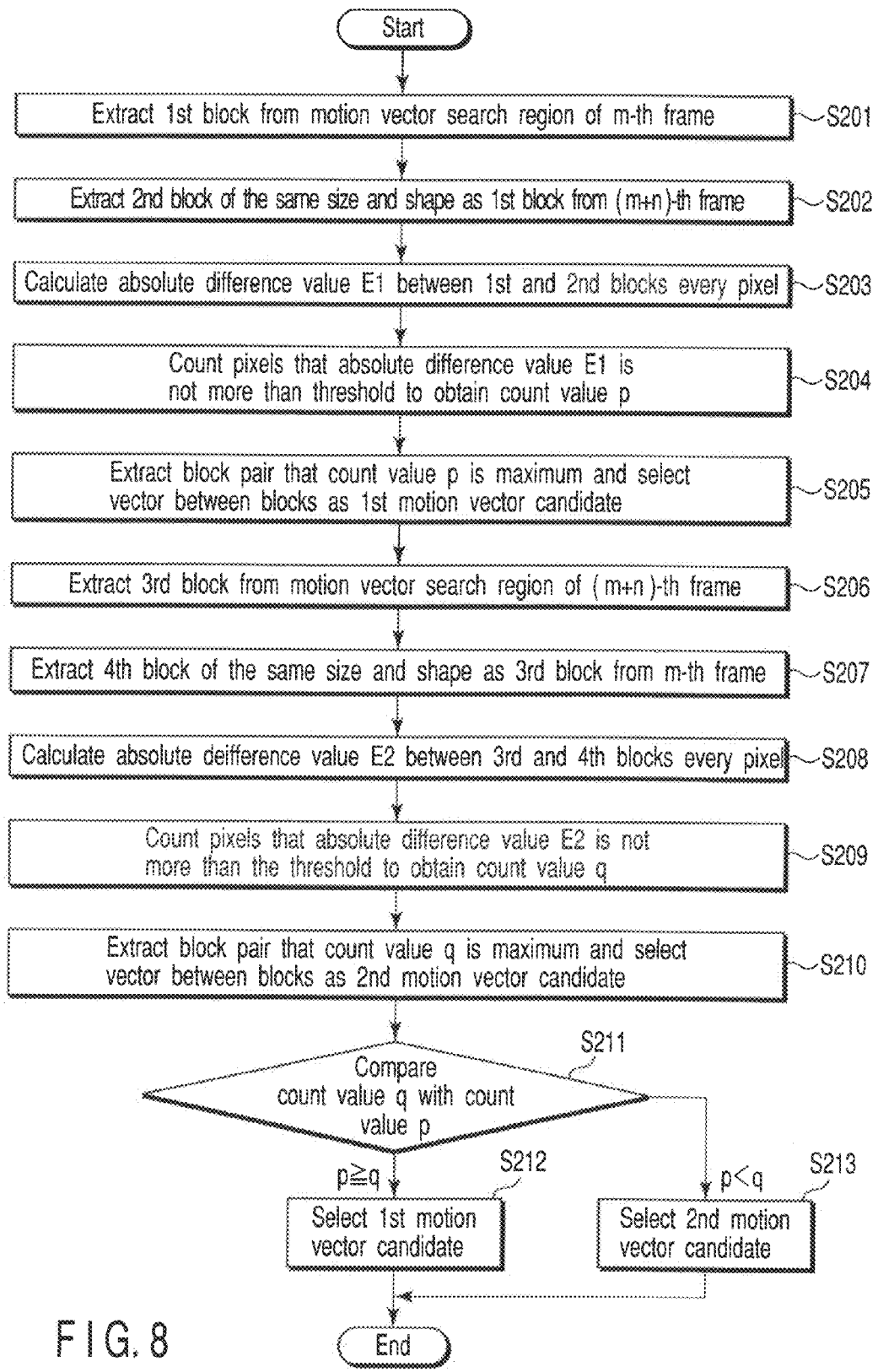
FIG. 8 is a flow chart that shows a motion vector detection procedure according to the embodiment.

As shown in FIG. 7, a motion vector from the m-th frame of an original picture (m is an integer) to the (m+n)-th frame (n is an integer not less than 1) is detected, and also a motion vector from the (m+n)-th frame to the m-th frame is detected. In the second embodiment of the present invention, such bidirectional motion vectors are detected according to a procedure shown in FIG. 8. The procedure of the present embodiment is described in conjunction with FIGS. 7 and 8 hereinafter. In FIG. 8, the process of steps S201 to S205 is similar to that of steps S101 to S105 of FIG. 2.

In other words, at first the image data of the m-th frame 1 is divided into a plurality of first blocks 11 to be extracted sequentially (step S101).

The second block 12 of the same size and shape as the first block 11 extracted in step S201 is extracted from the image data of the (m+n)-th frame 2 (step S202).

The first absolute difference values of opposite pixels of the first block 11 extracted in step S201 and the second block 12 extracted in step S202 are computed every pair of pixels (step S203).

Each of the first absolute difference values is compared with a common first threshold. The pixels that the first absolute difference value is not more than the first threshold are counted to obtain a first count value p (p is an integer more than 0) (step S204).

A pair of first and second blocks 11 and 12 that the first count value p obtained in step S204 becomes maximum are extracted every first block 11 extracted in step S201. A vector to connect between the blocks of the pair is selected as a first motion vector candidate D (step S205).

The image data of the (m+n)-th frame 2 is divided into a plurality of third blocks 13 to be extracted sequentially (step S206).

The fourth block 14 of the same size and shape as the third block 13 extracted in step S206 is extracted from the image data of the m-th frame 1 (step S207).

The second absolute difference value between the opposite pixels of the third block 13 extracted in step S206 and the fourth block 14 extracted in step S207 is computed every pair of pixels to obtain a plurality of second absolute difference values (step S208).

Each of the second absolute difference values is compared with a common second threshold. The pixels that the second absolute difference value is not more than the second threshold are counted to obtain a second count value q (q is an integer more than 0) (step S209).

A pair of third and fourth blocks 13 and 14 that the second count value q obtained in step S209 becomes maximum are extracted every third block 13 extracted in step S206. A vector to connect between the pair of blocks is selected as a second motion vector candidate D (step S205).

q is compared with the count value p (step S211). When p is not less than q, the first vector candidate D is selected as a motion vector (step S212). When p is smaller than q, the second vector candidate E is selected as a motion vector (step S213).

The first and second threshold values are a value selected appropriately. However, the threshold values may be different and the same value.

Figure 9:
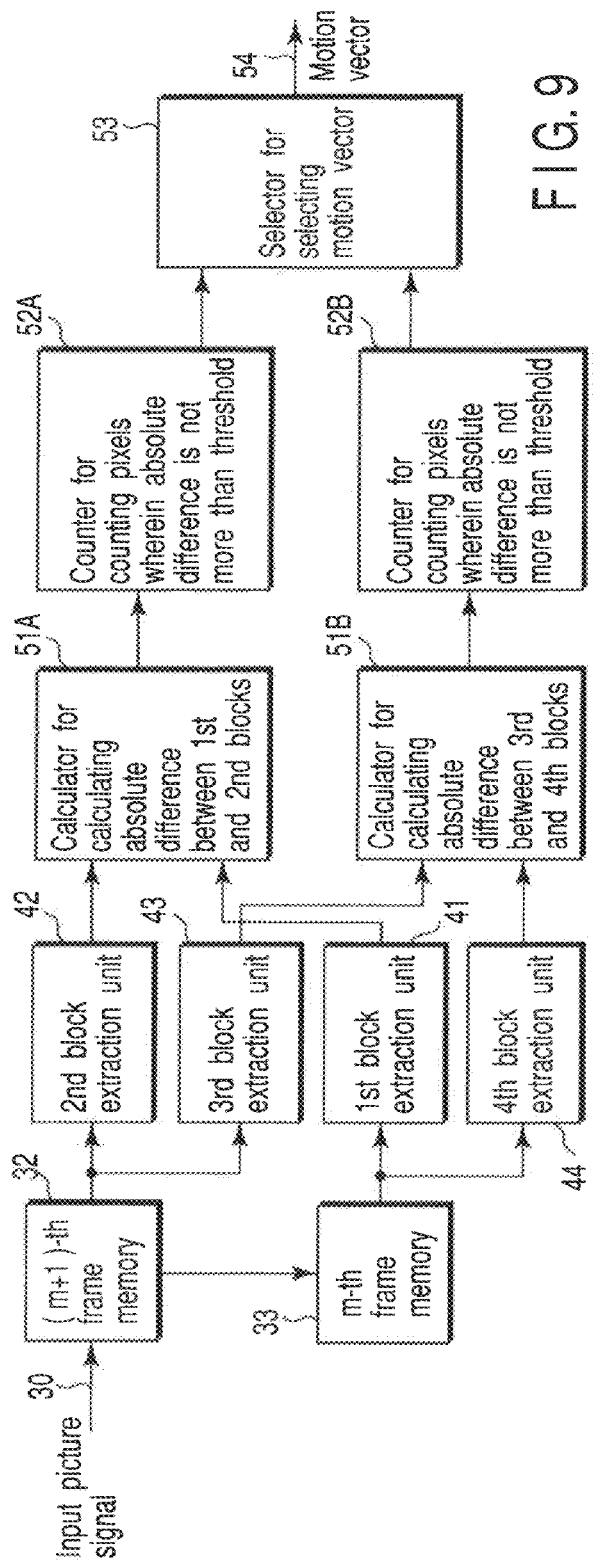
FIG. 9 is a block diagram that shows a configuration of a motion vector detection apparatus according to the embodiment.

The configuration of a motion vector detection apparatus for implementing the motion vector detection method according to the present embodiment is shown in FIG. 9. Assuming that n=1 in order to simplify explanation.

In FIG. 9, the third and fourth block extraction units 43 and 44 are added to the motion vector detection apparatus of the first embodiment shown in FIG. 6. Also, absolute difference calculation units 51A and 51B are provided. The absolute difference calculation unit 51A corresponds to the absolute difference calculation unit 51 shown in FIG. 6 and calculates an absolute difference value between the first and second blocks. The absolute difference calculation unit 51B calculates an absolute difference value between the third and fourth blocks. Furthermore, count units 52A and 52B are provided.

The count unit 52A corresponds to the count unit 52 shown in FIG. 6 and counts up the pixel number q. The count unit 52A counts up the pixel number p.

The process for obtaining the first motion vector candidate is executed similarly to the process for obtaining the motion vector D in the first embodiment. The first block extraction unit 41 executes the process of step S201 in FIG. 8, that is, extracts the first block from the m-th frame. The second block extraction unit 42 executes the process of step S202, that is, extracts the second block from the (m+1)-th frame.

When the picture signals of the first and second blocks are input to the absolute difference calculation unit 51A, the process of step S203, that is, a calculation for obtaining the absolute difference value E1 between a pair of opposite pixels is executed every pair of opposite pixels according to the equation (1). The absolute difference value E1 obtained by the absolute difference calculation unit 51A is input to the count unit 52A to count the pixels that the absolute difference value E1 is not more than the threshold, thereby to obtain the count value p. In this time, the process of step S204 is carried out. In other words, the absolute difference value E1 is compared with the threshold. The calculation to obtain the count value p of pixels that the absolute difference value is not more than the threshold is done every pair of first and second blocks. The count value p is input to the motion vector selection unit 53, the process of step 205 is carried out. In other words, the block pair that the count value p becomes maximum is extracted from the frames, and the first motion vector candidate D is detected and selected based on the extracted block pair.

On the other hand, in the process to detect the second motion vector candidate E, the third block extraction unit 43 performs the process of step S206 of FIG. 8, that is, extracts the third block from namely the (m+1)-th frame. The fourth block extraction unit 44 performs the process of step S207, that is, extracts the fourth block from the m-th frame. When the picture signals of the third and fourth blocks are input to the absolute difference calculation unit 51B, the absolute difference value E2 of opposite pixels is calculated every pair of the opposite pixels (step S208). The absolute difference value E2 is calculated by the following equation. Where E expresses a second candidate motion vector.

$$E2=|f(X,m+n)-f(X-E,m)| \quad (2)$$

The absolute difference value E2 obtained by the absolute difference calculation unit 51B is input to the count unit 52B for counting pixels that the absolute difference value is not more than the threshold. In this time, the process of step S209 is carried out. In other words, the absolute difference value E2 is compared with the threshold. The pixels that the absolute difference value E2 is not more than the threshold are counted every pair of third and fourth blocks to obtain the count value q. When the count value q is input to a motion vector selection unit 53, the process of step 210 is carried out. In other words, a pair of blocks that the count value q is maximum are extracted. The second motion vector candidate E is detected and selected based on the extracted pair of blocks.

Next, the process of step 211 is carried out. In other words, the count value p obtained when the first motion vector is detected is compared with the count value q. When p is not less than q, the first motion vector candidate D is finally selected as a motion vector. When p is smaller than q, the second motion vector E is finally selected as a motion vector.

In the present embodiment as described above, the motion vector detection from the m-th frame to the (m+n)-th frame and the motion vector detection from the (m+n)-th frame to the m-th frame are done. When the motion vector having a higher reliability between these motion vectors is selected, the motion vector can be detected with high precision.

(Third Embodiment)

Figure 10:
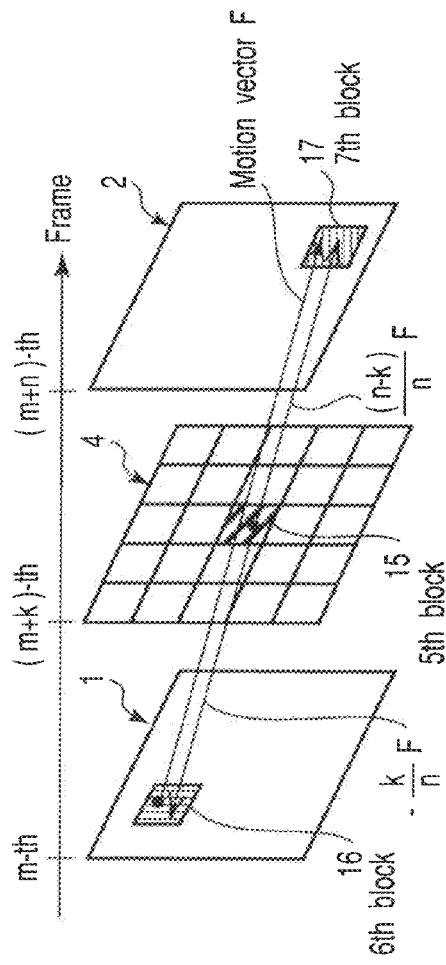
FIG. 10 is a diagram for explaining a motion vector detection method related to a third embodiment of the present invention.

As shown in FIG. 10, in order to detect a motion vector F between the m-th frame (m is an integer) 1 of an original picture and the (m+n)-th frame (n is an integer not less than k+1, k is a real number) thereof, the (m+k)-th (k is a real number) frame 4 is supposed to be between the m-th frame 1 and the (m+n)-th frame 2. Assuming that third and fourth motion vectors extend to the m-th frame 1 and (m+n)-th frame 2, respectively, from the (m+k)-th frame 4.

Figure 11:
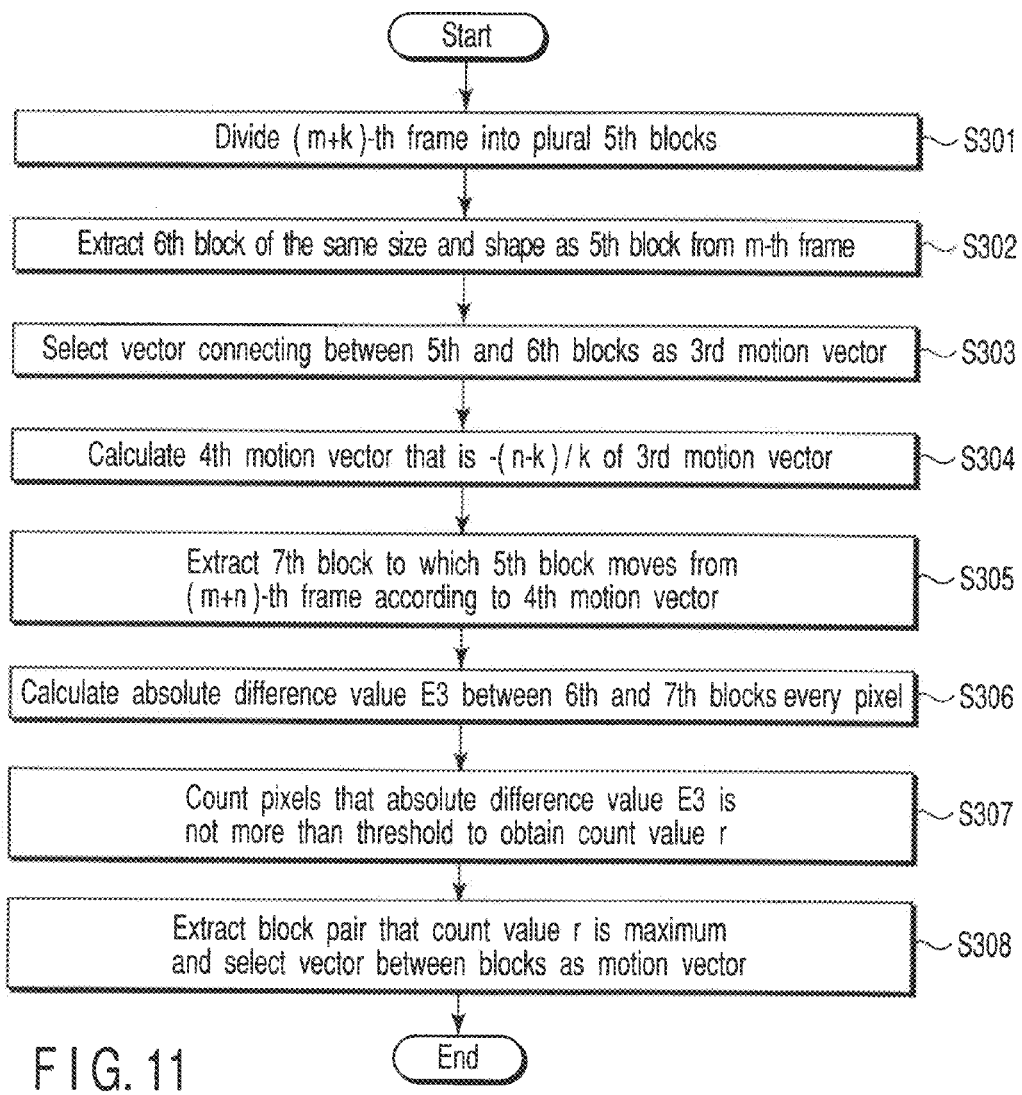
FIG. 11 is a flow chart that shows a motion vector detection procedure according to the embodiment.

The (m+k)-th frame 4 is an imagination frame which is supposed to be halfway between the m-th frame 1 and the (m+n)-th frame 2 as described above and does not exist in the original picture. It is a bunch of image data capable of newly forming based on the original picture. The process procedure of the present embodiment is described in conjunction with FIGS. 10 and 11 hereinafter.

At first, the image data of the (m+k)-th frame 4 is divided into a plurality of fifth blocks 15 to be extracted (step S301).

The sixth block 16 of the size and shape as the fifth block 15 is extracted from the image data of the m-th frame 1 (step S302).

The third vector connecting the fifth block 15 and the sixth block 16 is obtained as a motion vector (step S303). Assuming that the motion vector between the m-th frame 1 and (m+n)-th frame 2 is F, the third motion vector corresponding to the motion vector F corresponds to a motion vector obtained by scaling the motion vector F according to an interval between the (m+k)-th frame 4 and m-th frame 1. In other words, the third motion vector is expressed by $-F*k/n$ as shown in FIG. 10. The fourth motion vector which is $-(n-k)/k$ times the third motion vector is calculated (step S304).

As described above, when the third motion vector corresponding to the motion vector F between the m-th frame 1 and (m+n)-th frame 2 is supposed to be $-F*k/n$, the fourth motion vector is F (n−k)/n, and a motion vector obtained by scaling the motion vector F according to an interval between the (m+n)-th frame 1 and (m+k)-th frame 4.

The seventh block 17 to which the fifth block 15 moves is extracted from the (m+n)-th frame 2 according to the fourth motion vector (F(n−k)/n) (step S305).

The absolute difference value E3 of the opposite pixels of the sixth and seventh blocks 16 and 17 is calculated every pair of blocks (step S306).

The absolute difference value E3 is compared with the threshold. The pixels that the absolute difference value E3 is not more than the threshold are counted to obtain a count value r (r is an integer more than 0) (step S307).

The block pair of blocks that the count value r becomes maximum are extracted from the sixth and seventh blocks 17. The vector connecting between the extracted blocks is selected as the motion vector F (step S308).

The configuration of a motion vector detection apparatus carrying out the motion vector detection process related to the present embodiment is essentially the same as FIG. 6. The frame memories 32 and 33 store image data before and after in time with respect to the (m+k)-th frame 4 set to an arbitrary position in time. The absolute difference value E3 is calculated by the following equation:

$$E3 = \left| \int \left( xX - \frac{k}{n}F, m+n \right) - \int \left( X + \frac{(n-k)}{n}F, m \right) \right| \quad (3)$$

(Fourth Embodiment)

Figure 12:
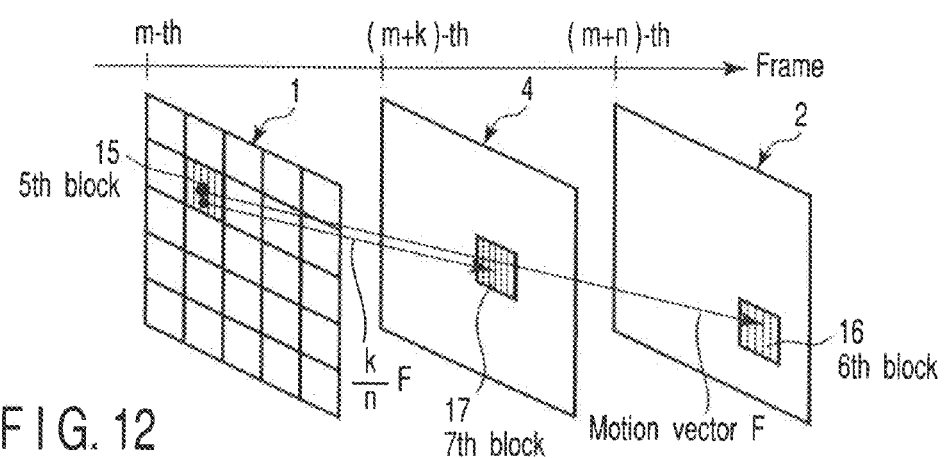
FIG. 12 is a diagram for explaining a motion vector detection method related to a fourth embodiment of the present invention.

The fourth embodiment of the present invention adds a function for determining errors of a vector. In the present embodiment, the condition that the (m+k)-th frame 4 is a frame including an original picture differs from the third embodiment. As shown in FIG. 12, the (m+k)-th frame 4 of an original picture is located halfway between the m-th frame (m is an integer) 1 and (m+n)-th frame (n is more than k+1, k is an integer more than 1) 2, and a motion vector between the m-th frame 1 and (m+n)-th frame 2 is detected.

Figure 13:
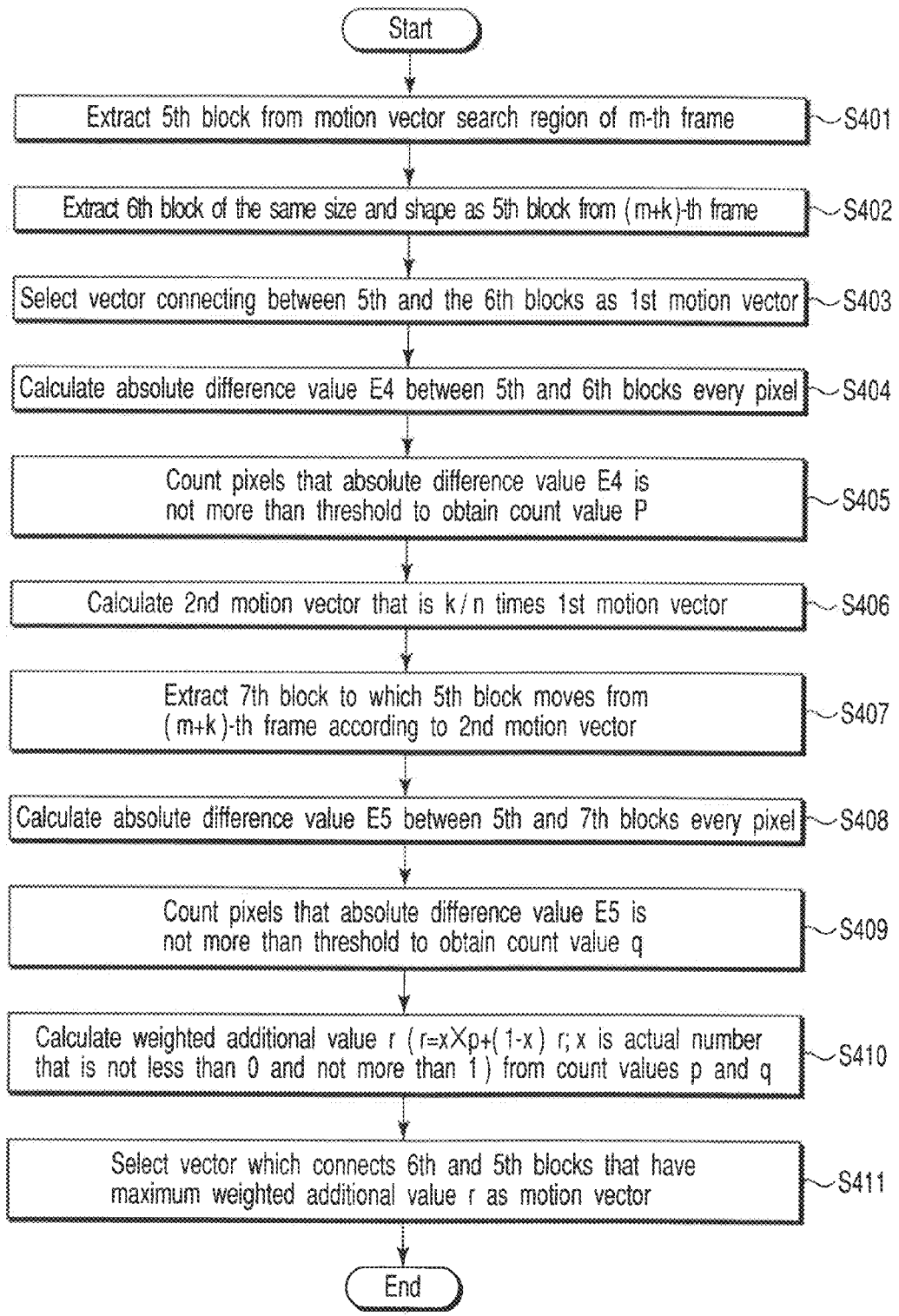
FIG. 13 is a flow chart that shows a motion vector detection procedure according to the embodiment.

The (m+k)-th frame 4 in the present embodiment is a true frame including an original picture as described above. The (m+k)-th frame 4 differs from the (m+k)-th frame as the virtual frame described in the third embodiment, but they may be at the same position on a time base. In the present embodiment, a motion vector is detected according to the procedure shown in FIG. 13. The process procedure of the present embodiment is described in conjunction with FIGS. 12 and 13 hereinafter.

At first, Image data of the m-th frame 1 is divided into a plurality of fifth blocks 15 to be extracted (step S401).

The sixth block 16 of the same size and shape as the fifth block 15 is extracted from image data of the (m+n)-th frame 2 (step S402).

The vector connecting between the fifth block 15 and the sixth block 16 is extracted as the motion vector F (step S403).

The absolute difference value E4 of the opposite pixels of the fifth and sixth blocks is calculated every pair of pixels (step S404).

The absolute difference value E4 is compared with the threshold. The pixels that the absolute difference value is not more than the threshold is counted to obtain a count value p (p is an integer more than 0) (step S405).

In correspondence with the first motion vector F, the second motion vector F*k/n which is k/n times the first motion vector F is calculated (step S406).

The seventh block 17 that is a locomotive point of the fifth block 15 is extracted from the (m+k)-th frame 4 based on the second motion vector F*k/n (step S407).

The absolute difference value E5 between the opposite pixels of the fifth and seventh blocks 15 and 17 is calculated every pair of pixels (step S408).

The absolute difference value E5 is compared with the threshold. The pixels that the absolute difference value E5 is not more than the threshold are counted to obtain a count value q (q is an integer more than 0) (step S409).

A weighted additional value r (r=x×p+(1−x) r; x is a real number more than and not more than 1) is calculated from the count values p and q (step S410).

A pair of blocks that the weighted additional value r is maximum is extracted from the fifth and sixth blocks 15 and 16, and the first vector F connecting the blocks of the block pair is selected as a motion vector between the m-th frame 1 and (m+n)-th frame 2 (step S411).

The configuration of a motion vector detection apparatus carrying out the motion vector detection process according to the present embodiment is shown in FIG. 14. Assuming that n=2 and k=1 in order to simplify explanation.

An input image signal 30 is input to an m-th frame memory 31, an (m+1)-th frame memory 32 and an (m+2)-th frame memory 33 sequentially. The picture signals of the m-th frame, (m+1)-th frame and (m+2)-th frame are read from the memories 31, 32 and 33.

A fifth block extraction unit 45 extracts the fifth block from the m-th frame, and a sixth block extraction unit 46 extracts the sixth block from the (m+1)-th frame. A first motion vector calculation unit 61 calculates the first motion vector F which connects between the sixth and fifth blocks. A absolute difference calculation unit 51C calculates an absolute difference value E4 between the pixel signals of the fifth and sixth blocks every pair of opposite pixels of the fifth and sixth blocks. The absolute difference value E4 is input to a count unit 52A and is compared with the threshold. The count unit 52A counts pixels that the absolute difference value E4 is not more than the threshold to obtain a count value p. The count value p is obtained every pair of blocks and input to a motion vector selection unit 53.

The first motion vector F is input to the second motion vector generation unit 62 to calculate a second motion vector F*k/n which is k/n times the first motion vector F. The seventh block extraction unit 47 extracts the seventh block that is a locomotive point of the fifth block from the (m+1)-th frame according to the second motion vector F*k/n. An absolute difference calculation unit 51D calculates an absolute difference value E5 between the picture signals of the fifth and seventh blocks every pair of opposite pixels of the blocks. The absolute difference value E5 is input to a count unit 52B and is compared with the threshold. The count unit 52B counts pixels that the absolute difference value E5 is not more than the threshold to obtain a count value q. The count value q is obtained every pair of blocks and is input to a motion vector selection unit 53.

At last, the motion vector selection unit 53 calculates from the count value p and count value q weighted additional value r (r=x×p+(1−x) r; x is a real number more than 0 and not less than 1). The first motion vector F that connects between the sixth and fifth blocks that the weighted additional value r is maximum is selected as a motion vector between the m-th frame and (m+n)-th frame.

The absolute difference value E4 between the fifth and sixth blocks is calculated by the following equation.

$$E4=|f(X+F,m+n)-f(X,m)| \quad (4)$$

The absolute difference value E5 between the fifth and seventh blocks is calculated by the following equation.

$$E5 = \left| f\left(X + \frac{k}{n}F, m+k\right) - f(X,m) \right| \quad (5)$$

(Fifth Embodiment)

In the fifth embodiment, when a motion vector between the m-th frame (m is an integer) 1 of an original picture and the (m+n)-th frame (n is an integer more than 1) 2 is detected as shown in FIG. 15, each block of each frame is divided into a plurality of regions to detect a motion vector every region. The process procedure of the present embodiment is described in conjunction with FIGS. 15 and 16 hereinafter.

For the purpose of simplifying explanation, n=1 and the block is divided in two regions.

At first, the image data of the m-th frame 1 is divided into a plurality of first blocks 11 to be extracted sequentially (step S501).

The second block 12 of the same size and shape as the first block 11 is extracted from the image data of the (m+1)-th frame 2 (step S502).

The absolute difference value E1 between the opposite pixels of the first and second blocks 11 and 12 is calculated every pair of opposite pixels of the blocks (step S503).

The absolute difference value E1 is compared with the first threshold. The pixels that the absolute difference value E1 is not more than the threshold are counted to obtain a count value p (p is an integer more than 0) (step S504).

The first vector to connect between the first block 11 that the count value p is maximum and the second block 12 is assumed to be a motion vector (first region motion vector) E between the first region and the (m+1)-th frame (step S505).

The absolute difference value E1 is compared with the second threshold. The pixels in the first block 11 that the absolute difference value E1 is not more than the threshold are extracted as a pixel block 21 of the first region (step S506).

The pixels in the first block 11 that the absolute difference value E1 is larger than the second threshold are extracted as a pixel block 22 of the second region (step S507).

The third block 13 of the same size and shape as the pixel block 22 is extracted from the image data of the (m+1)-th frame 2 (step S508).

The absolute difference value E6 between the opposite pixels of the pixel block 22 of the second region and the third block 13 is obtained every pair of opposite pixels (step S509).

The absolute difference value E6 is compared with the third threshold, and the pixels that the absolute difference value E6 is not more than the third threshold are counted to obtain a count value s (s is an integer more than 0) (step S510).

At last, the vector connecting between the third block 13 and the pixel block 22 of the second region that the count value s is maximum is selected as a motion vector between the second region and the (m+1)-th frame (step S511).

The first to third thresholds are values appropriately selected. However, they may be different to one another, and two or more of them may be the same values.

Figure 17:
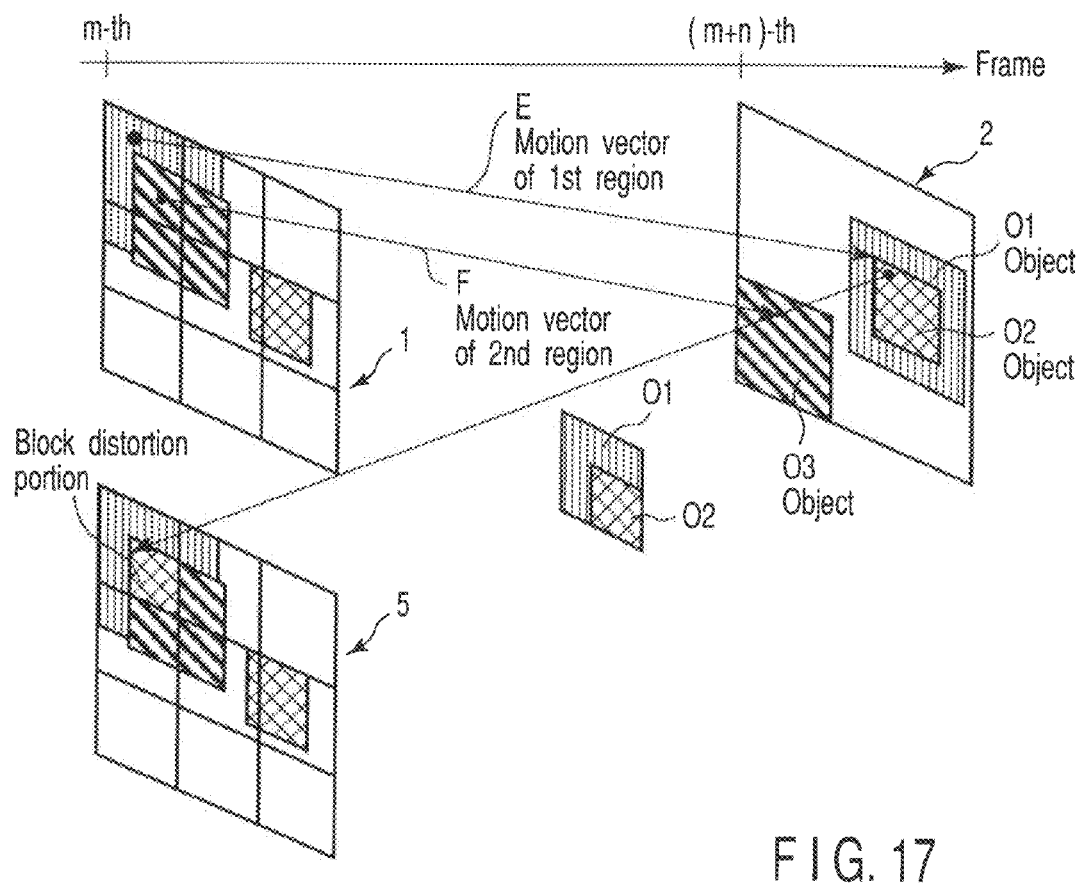
FIG. 17 is a diagram of explaining origin of block distortion.

FIG. 17 shows the m-th frame 1, the original picture of the (m+n)-th frame 2 and a frame 5. The frame 5 shows a picture obtained by reconstructing the m-th frame 1 from the motion vector E of the first region without dividing the region. According to this figure, an object O1 moves to the right direction, an object O3 moves to a lower direction, and an object O2 stands still. The motion vector E of the first region is acquired by the component of the object O1. However, in the (m+n)-th frame 2, the object O3 gets into the block. When the block is taken in the image of the playback frame 5 of the m-th frame 1, a wrong part is reproduced in the block of the playback frame 5, resulting in so-called block distortion. This becomes a problem particularly in an interpolation image generation using no differential signal.

In contrast, according to the present embodiment, the block is divided into a plurality of regions and a motion vector is detected every region. As a result, occurrence of the block distortion can be prevented.

The configuration of a motion vector detection apparatus carrying out the motion vector detection process related to the present embodiment is shown in FIG. 18. An input image signal 30 is input to the (m+1)-th frame memory 32 and the m-th frame memory 33 sequentially. the picture signals of the (m+1)-th frame and m-th frame are read from the frame memories 32 and 33 respectively.

The first block extraction unit 41 extracts the first block from the m-th frame, and the second block extraction unit 42 extracts the second block from the (m+1)-th frame. When the picture signals of the first and second blocks are input to the absolute difference calculation unit 51A, the absolute difference value E1 between the opposite pixels of the first and second blocks is obtained every pair of blocks. The absolute difference value E1 is calculated based on the equation (1). The absolute difference value E1 is input to the count unit 52A and compared with the threshold, and the pixels that the absolute difference value is not more than the threshold is counted every block pair to obtain a count value p. The count value p is input to a motion vector selection unit 53A. The motion vector selection unit 53A extracts the block pair that the count value p becomes maximum, and detects and selects a motion vector of the first region.

A pixel block extraction unit 55A extracts pixels in the first block that the absolute difference value E1 is not more than the threshold, and a pixel block extraction unit 55B extracts pixels in the first block that the absolute difference value E1 is larger than the threshold. An address signal of the pixel of the second region is input to the (m+1)-th frame memory 32 from pixel block extraction unit 55B. The third block is extracted from the frame memory 32 by the third block extraction unit 43.

The absolute difference calculation unit 51E calculates every pair of blocks an absolute difference value E6 between the opposite pixels of the pixel block of the second region and the third block. The absolute difference value E6 is obtained by the same calculation as the calculation for obtaining the absolute difference value E1 based on the expression (1). The absolute difference value E3 is input to the count unit 52B and is compared with the threshold. The count unit 52B counts pixels that the absolute difference value E3 is not more than the threshold to obtain a count value q. The count value q is counted every block pair and input to the motion vector selection unit 53B. This motion vector selection unit 53B extracts the block pair that the count value q becomes maximum, and detects and selects a motion vector of the second region.

According to the embodiment as described above, a pair of blocks each including the maximum number of pixels that the absolute difference is not more than the threshold are obtained by block matching. A motion vector between the pair of blocks is detected.

(Sixth Embodiment)

The sixth embodiment of the present invention is described referring to FIG. 19. The present embodiment improves a method of extracting a pixel block of the first region and a pixel block of the second region in the fifth embodiment.

It is proved by an experiment of inventors that a region of a few pixels such as one or two pixels includes a noise when a pixel block of the second region is extracted. In the present embodiment, a filtering process is done as a preceding process for extracting the pixel block of the second region in order to suppress such a noise. This filtering process is a process for making the pixel block pass through a low pass filter for performing spatial low-pass filtering (a spatial region low pass filter) to limit somewhat the size of the pixel block of the first region. This state is shown in FIG. 19.

In other words, a spatial region low pass filter 6 is provided in the pixel block extraction unit 55A shown in FIG. 18 and explained in the fifth embodiment or a spatial region low pass filtering process is added to step S506 of FIG. 17. When the pixel block 11 of the first region is passed through the spatial region low pass filter 6, a pixel block of a small region is removed. The pixel block of the first region from which the small region is removed is set as a final pixel block of the first region. In this case, a mask wherein pixels not more than the threshold are 1 and others are 0 is generated. The mask is filtered with the low pass filter 6. The pixels not more than the threshold may be 0 and others may be 1.

A median filter may be used for the spatial region low pass filter 6. In the median filter, whether a pixel adjacent to an object pixel belongs to the first region is determined for, for example, eight adjacent pixels including the object pixel. When five or more pixels belong to the first region, the object pixel is determined to be the first region. When four or less pixels belong to the first region, the object pixel is determined to be the second region. Repeating such a process allows all pixels to subject to the spatial region low-pass filtering. Alternatively, there may be used a method wherein a monochromatic image having first and second regions separated by contrast (referred to a region map) is created and then subjected to a Fourier transform to extract a low frequency component, and reproduce a region map by subjecting the image to the inverse Fourier transform.

(Seventh Embodiment)

Figure 20:
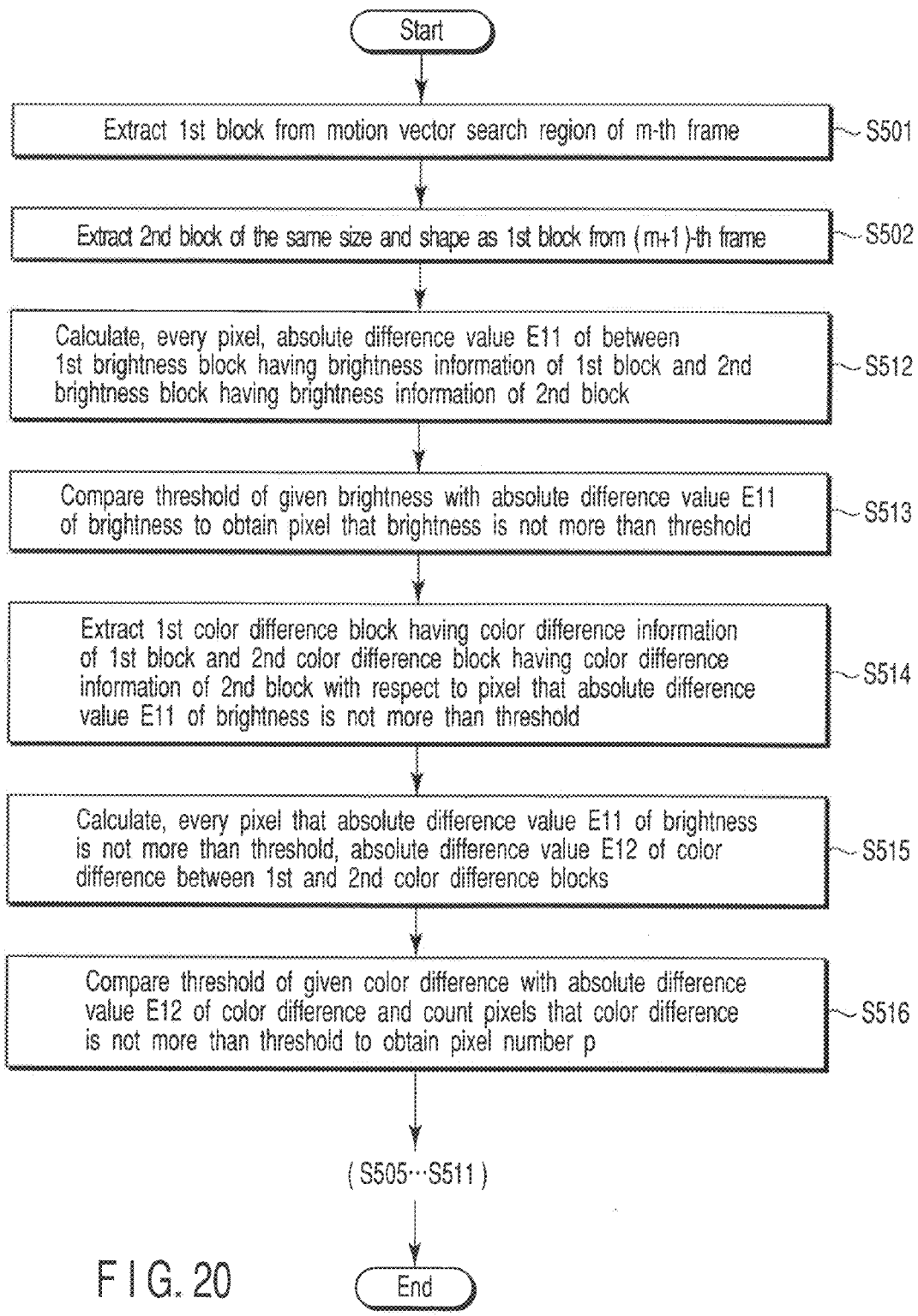
FIG. 20 is a flow chart showing a region division and motion vector detection procedure related to a seventh embodiment of the present invention.

The seventh embodiment of the present invention is described referring to FIG. 20. The seventh embodiment improves a method of extracting a pixel block of the first region in the fifth embodiment and a pixel block of the second region.

In the present embodiment, a preprocessing for suppressing a noise due to a part divided in a few pixels such as one or two pixels is done before extraction of the pixel block of the second region. The preprocessing includes a threshold determination process of a brightness component used in a conventional block matching technique in an extraction process for extracting a pixel block of the first region, and a threshold determination process on a color difference component. More specifically, as shown in a flow chart of FIG. 20, for example, the following process is done instead of steps S503 and S504 of FIG. 16.

In other words, an absolute difference value (first absolute difference value) E11 between the brightness values of the opposite pixels of first and second brightness blocks having first and second brightness information respectively is calculated (step S512).

The first absolute difference value E11 is compared with a first threshold of a given brightness, and pixels that the first absolute difference value E11 is not more than the first threshold are extracted from the first and second brightness blocks (step S513).

As for the pixels that the first absolute difference value E11 of the first and second blocks becomes not more than the first threshold, a first color difference block having first color difference information and a second color difference block having second color difference information are extracted from the first and second block respectively (step S514).

An absolute difference value (second absolute difference value) E12 between the color differences of the first and second color difference blocks is calculated every pair of pixels that the first differential value E11 is not more than the first threshold (step S515).

The second absolute difference value E12 is compared with a second threshold on a given color difference, and pixels that the second absolute difference value E12 is not more than the second threshold are counted to obtain a count value p (p is an integer more than 0) (step S516).

Figure 16:
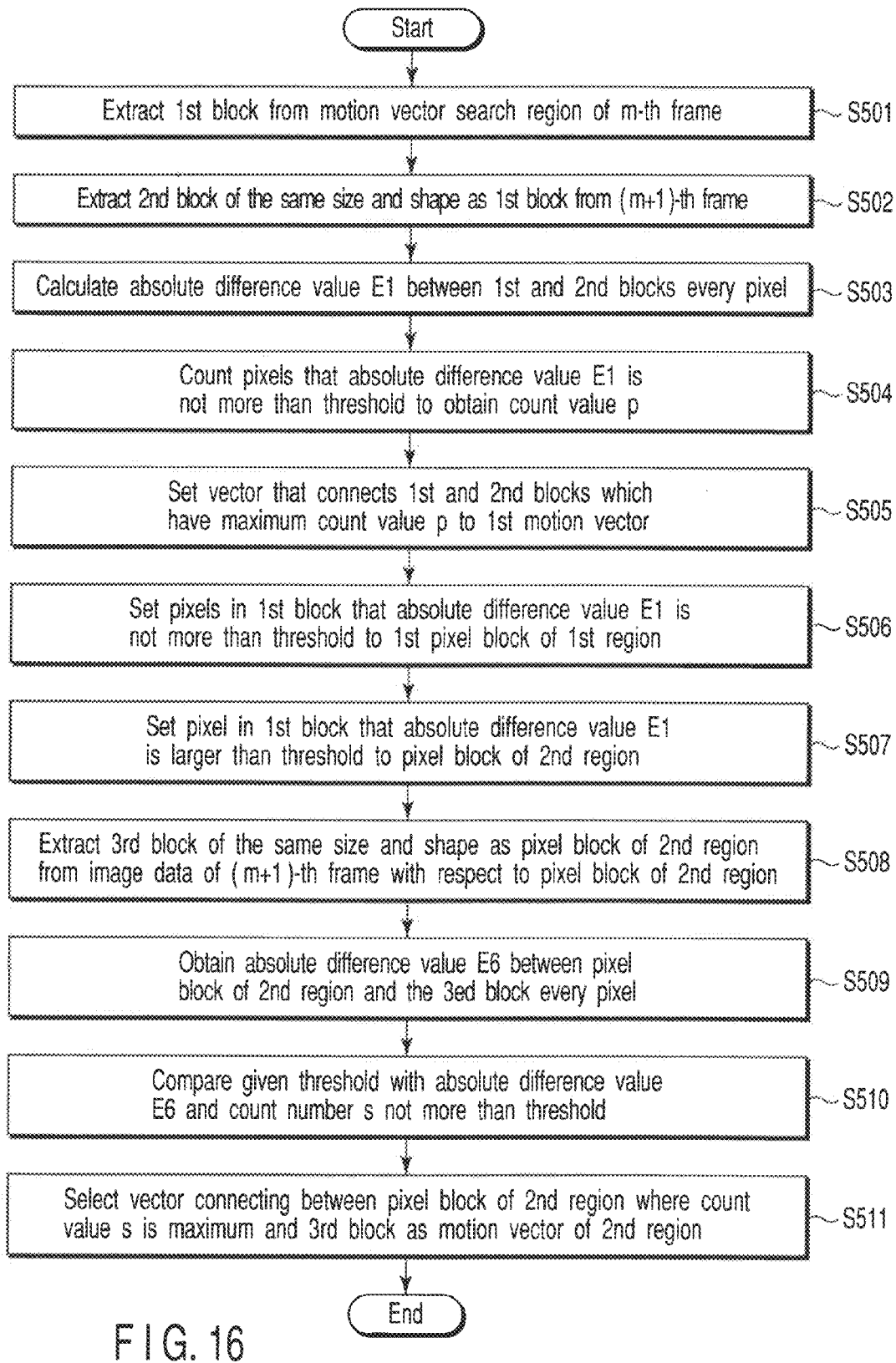
FIG. 16 is a flow chart which shows the region division and motion vector detection procedure according to the embodiment.

The process in and after step S516 may be the same process as steps S505 to S511 in FIG. 16, except that the pixel block of the first region is not more than the threshold also on the color difference. In other words, in step S505, a vector connecting between the first and second blocks 11 and 12 that the count value p is maximum is a motion vector (first region motion vector) between the first region and the (m+1)-th frame.

In step S506, the second absolute difference value E12 is compared with the second absolute threshold, and the first pixels in the first block that the second absolute difference value E12 is not more than the second threshold forms a pixel block 21 of the first region.

In step S507, the second absolute difference value E12 is compared with the second threshold, and the pixels in the first block than the second absolute difference value E12 is not more than the second threshold forms a pixel block 22 of the second region.

In step S508, a third block 13 of the same size and shape as the pixel block 22 of the second region is extracted from image data of the (m+1)-th frame 2.

In step S509, the third absolute difference value E13 is calculated every pair of opposite pixels with respect to brightness of opposite pixels of the pixel block 22 of the second region and the third block 13.

In step S510, a third threshold is compared with the third absolute difference value E13, and the pixels that the third absolute difference value E13 is not more than the third threshold are counted to obtain a count value s (s is an integer more than 0).

In step S511, a vector connecting between the pixel block 22 of the second region that the count value s is maximum and the third block 13 is selected as a motion vector (second region motion vector) between the second region and the (m+1)-th frame.

The first to third thresholds are a value selected appropriately. However, the thresholds may be different to one another, and two or more thresholds may be the same value.

(Eighth Embodiment)

An example that improves an extraction method of a pixel block of the second region in the fifth embodiment is described as the eighth embodiment of the present invention. The present embodiment differs from the fifth embodiment in a point that a motion vector is searched by connecting the pixel blocks of adjacent second regions when the pixel block of the second region is extracted.

Figure 21:
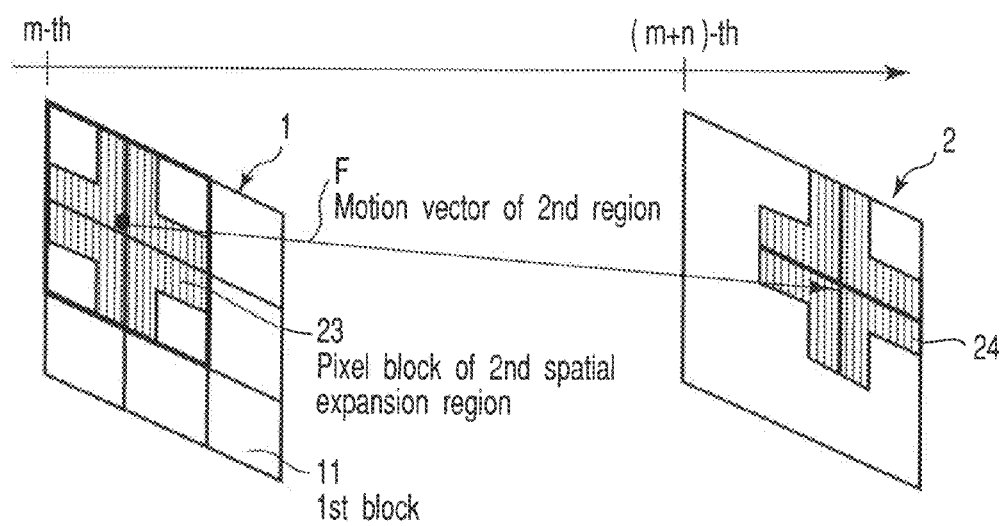
FIG. 21 is a diagram of explaining region division and motion vector detection method related to an eighth embodiment of the present invention.

The second region of the first block included in the m-th frame 1 is connected in space to the second region of another first block adjacent thereto as shown in FIG. 21 to make a pixel block 23 of a second spatial expansion region. A pixel block 24 of a third spatial expansion region which has the same size and shape as the pixel block 23 of the second spatial expansion region is extracted from image data of a (m+n)-th frame 2.

A absolute difference value between the opposite pixels of the pixel block 23 of the second spatial expansion region and the pixel block 24 of the third space expansion region is calculated every pair of opposite pixels.

The absolute difference value is compared with a given threshold, and the pixels that the absolute difference value is not more than the threshold are counted to obtain a count value s (s is an integer more than 0).

A vector connecting between the pixel block 23 of the second spatial expansion region and the pixel block of the third spatial expansion region that the count value s is maximum is selected as a motion vector (second spatial expansion region motion vector).

(Ninth Embodiment)

An example that improves an extraction method of a pixel block of the second region in the fifth embodiment is described as the ninth embodiment of the present invention.

The present embodiment differs from the fifth embodiment in a point that a search range is expanded in a time axis direction when the pixel block of the second region is extracted.

FIG. 22 shows an example that still objects O1 and O2 and an object O3 which moves from the lower right of the screen to the upper left thereof are on five frames from the (m−2)-th frame 7 to the (m+2)-th frame 9. The object O3 is on the back of the object O1 and appears in the m-th frame 1. In the (m+1)-th frame 2 on and after, the object O3 moves while covering the object O2 since it is on the front of the object O2. In other words, the object O2 is disappeared due to the object O1 in the (m+1)-th frame 2 and (m+2)-th frame 9.

As understood from FIG. 22, the motion of the pixel block 21 of the first region of the m-th frame 1 can be searched between the m-th frame 1 and the (m−1)-th frame 8. However, the motion of the pixel block 21 cannot be searched between the m-th frame 1 and the (m+1)-th frame 2 because the pixel block 21 of the first region is disappeared by the object O3 on the (m+1)-th frame 2. Similarly, the motion of the pixel block 22 of the second region of the m-th frame 1 cannot be searched because the pixel block 22 disappears between the m-th frame 1 and the (m−1)-th frame.

As thus described, there is a case where the motion of the pixel block 21 of the first region and pixel block 22 of the second region cannot be searched due to a hidden surface relation between objects. A method to solve such a hidden surface relation is to preferably expand a search region in a time axis direction.

The present embodiment adopts a method for searching for a pair of blocks by expanding a search range in a time axis direction, when the motion vector between the m-th frame (m is an integer) 1 and the (m+n)-th (n is an integer more than 1) frame 2 is searched. In particular, the expansion of a search range for the pixel block of the second region enables to search the motion of the second region of the decreased number of pixels with a good precision. Assuming that n=1, k=−2, −1, 2 to simplify explanation.

At first, the pixel block 21 of the first region and the pixel block 22 of the second region are extracted from the m-th frame 1 similarly to the sixth embodiment. Thereafter, the third block 16 of the size and shape as the pixel block 22 of the second region is extracted from the image data of the (m+1)-th frame 2.

A motion vector connecting between the pixel block 22 of the second region and the third block 16 is acquired as the third motion vector. If the third motion vector is F, a motion vector obtained by scaling the third motion vector F according to an interval between the (m+2)-th frame 4 and the m-th frame 1 is 2F.

The fourth block 17 corresponding to a locomotive point to which the pixel block 22 moves is extracted from the (m+2)-th frame according to the motion vector 2F.

The fifth block 18 of the same size and shape as the pixel block 22 of the second region is extracted from the image data of the (m−1)-th frame 8.

A vector connecting between the pixel block 22 of the second region and the fifth block 18 is acquired as the fourth motion vector. If the fourth motion vector is G, a motion vector obtained by scaling the vector G according to an interval between the (m−2)-th frame and the m-th frame 1 is 2G.

The sixth block 19 that is a locomotive point of the pixel block 22 is extracted from the (m−2)-th frame according to the motion vector 2G.

The absolute difference values between the opposite pixels of the pixel block 22 of the second region and the third, fourth, fifth and sixth blocks are calculated every pair of opposite pixels.

Each of the absolute difference values is compared with the threshold, and the pixels that the absolute difference value is not more than the threshold are counted to obtain a count value s (s is an integer more than 0).

Assuming that the count values s concerning the pixel block 22 and the third block, fourth block, fifth block and sixth block are S3, S4, S5 and S6.

The sum of the count values S3 and S4 is compared with the sum of the count values S5 and S6, and combination of the count values corresponding to the larger sum is selected. In other words, when the sum of the count values S3 and S4 is larger than the sum of the count values S5 and S6, the third motion vector connecting between the pixel block 22 and the third block is selected as a motion vector of the pixel block 22 of the second region.

(Tenth Embodiment)

Figure 23:
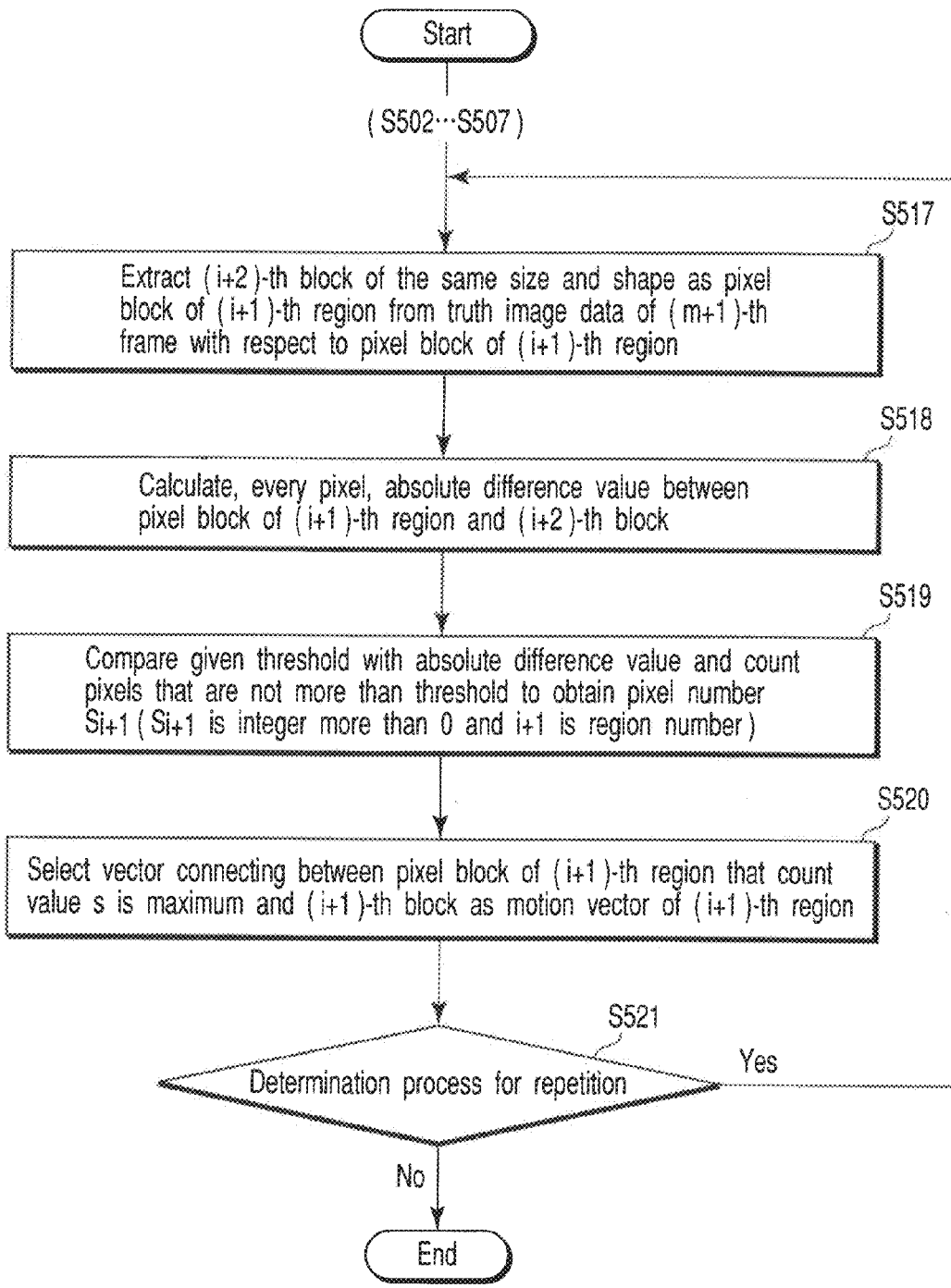
FIG. 23 is a flow chart shows a region division and motion vector detection procedure according to the tenth embodiment of the present invention.

There will now be described in conjunction with FIG. 23 the tenth embodiment of the present invention that increases the number of partitions by dividing the block repeatedly, and acquires a plurality of motion vectors on a pixel block of each region. The motion vector detection and the motion vector detection after the region division can use either of the methods of the first to ninth embodiments. However, the process for repeating the region division in order to increase the partitions differs from the preceding embodiments.

In other words, in the pixel block of the second region on and after, at first the (i+2)-th block of the same size and shape as the pixel block of the (i+1)-th region is extracted from the image data of the (m+1)-th frame (step S517).

The absolute difference value between the opposite pixels of the pixel block of the (i+1)-th region and the (i+2)-th block is calculated every pair of opposite pixels (step S518).

The absolute difference value obtained in step S518 is compared with a given threshold, and the pixels that the absolute difference value is not more than the threshold are counted to obtain a count value i+1 (s i+1 is an integer more than 0; i+1 is the region number) (step S519).

A vector connecting between the pixel block of the (i+1)-th region and the (i+1)-th block that the count value s is maximum is selected as the motion vector of the (i+1)-th region (step S520).

At last, whether the process should be repeated is determined (step S521). When the repetition of the process is determined, the process of steps S517 to S520 is repeated again. When the end of the process continuation is determined, the process is finished.

A process of step S521 may be any kind of method. However, if the number of pixels that the absolute difference value is larger than the threshold decreases, for example, if it is not more than 5% of the number of pixels in the first block, the process may be finished. Also, the process in step S521 may be done from the region map. If the number of pixels that the absolute difference value is larger than the threshold is small (not more than 10% of the number of pixels in the first block), and the spatial frequency of the region map is high, it is conceivable that one or two pixels lies scattered on the region map. As a result, if the motion vector search is further performed, errors increase. For this reason, the repetition of the process is finished.

(Eleventh Embodiment)

Figure 25:
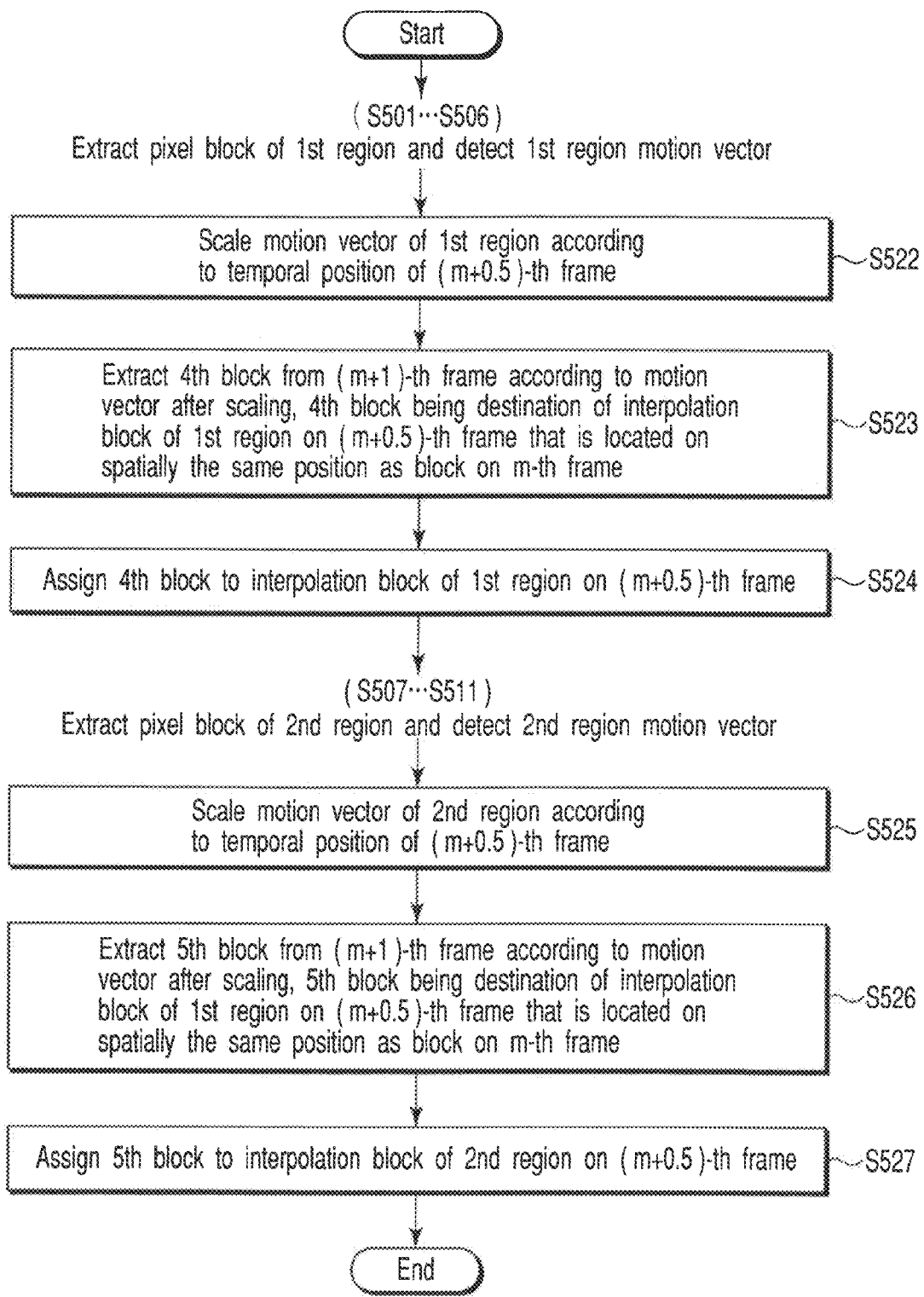
FIG. 25 is a flow chart showing a region division and motion vector detection procedure according to the embodiment.
Figure 27:
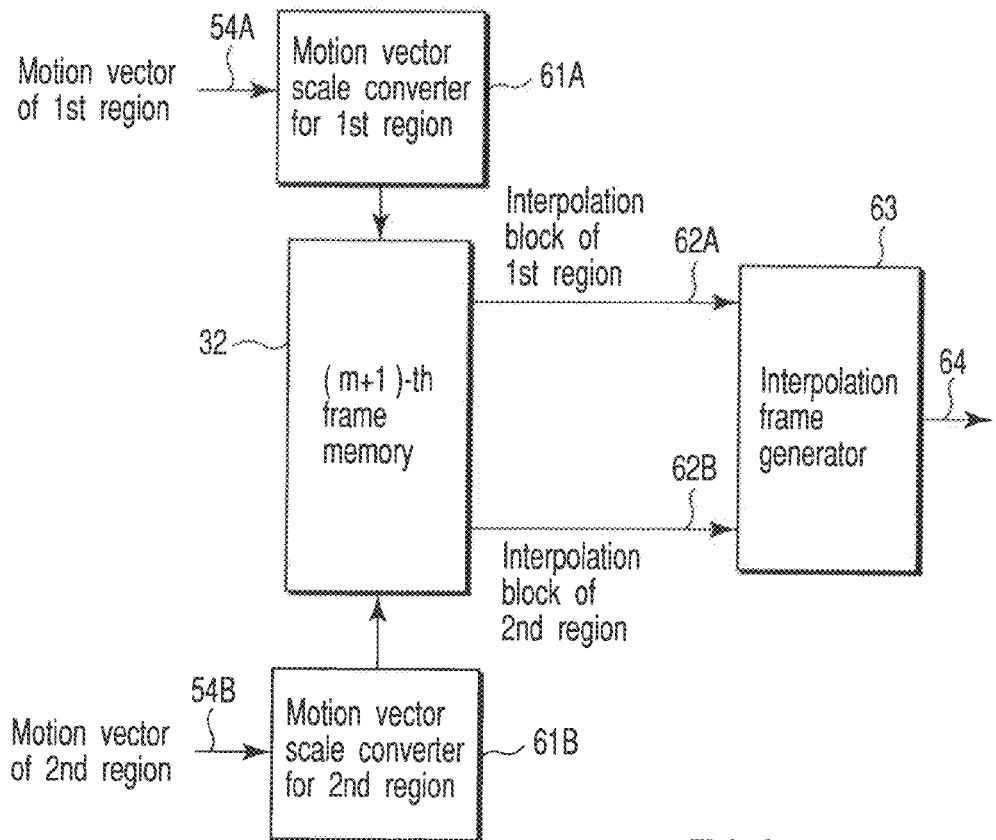
FIG. 27 is a block diagram that shows a configuration of an interpolation image forming apparatus according to the embodiment.

An interpolation image forming method for forming an interpolation image in the (m+k)-th frame (k is a real number) between the m-th frame (m is an integer) and the (m+n)-th frame (n is an integer not less than 1) is described as the eleventh embodiment referring to FIGS. 24 and 25. Assuming that n=1, k=0.5 to simplify explanation. An interpolation image is formed between the m-th frame 1 and the (m+1)-th frame 2, that is, at the position of the (m+0.5)-th frame 10.

A method for detecting a pixel block of the first region uses the same method as the fifth embodiment. A method for detecting a motion vector can use a method of either of the first, second and fourth embodiments. In other words, extraction of the pixel block 21 of the first region in the first block 11 and detection of the motion vector E of the first region are done in steps S501 to S506 of FIG. 16.

The motion vector E of the first region is scaled according to a time axis position of the (m+0.5)-th frame 10 (step S522). In this case, the motion vector after scaling is E/2.

The fourth block 14 that is a locomotive point of the interpolation block 25 of the first region on the (m+0.5)-th frame 10 that is on spatially the same location as the first block 11 on the m-th frame 1 is extracted from (m+1)-th frame 2 according to a motion vector E/2 (step S523).

The fourth block 14 is assigned to the interpolation block 25 of the first region in (m+0.5)-th frame 10 (step S524).

Extraction of the pixel block 22 of the second region from the first block 11 and detection of the motion vector F of the second region is done using the same method same as the fifth embodiment, that is, steps S507 to S511 of FIG. 16.

The motion vector F of the second region is scaled according to the time axis position of the (m+0.5)-th frame 10 (step S525). In this case, a motion vector after scaling is F/2.

The fifth block 15 which is a locomotive point of the interpolation block 26 of the second region on the (m+0.5)-th frame 10 that is on spatially the same location as the pixel block 21 of the second region on the m-th frame 1 is extracted from the (m+1)-th frame 2 according to a motion vector E/2 (step S526).

At last, the fifth block 15 is assigned to the interpolation block 25 of the second region of the (m+0.5)-th frame 10 (step S527).

The configuration of an interpolation image forming apparatus carrying out the interpolation image forming process related to the present embodiment is shown in FIG. 26. Only a part to be added after the motion vectors of the first region and the second region are detected in accordance with the fifth embodiment is described. The motion vector signal 54A of the first region is input to a motion vector scaling unit 61A to scale the motion vector. The interpolation block 62A of the first region is extracted from (m+1)-th frame memory 32 using the scaled motion vector and output to an interpolation frame generation unit 63.

Similarly, the motion vector signal 54B of the second region is input to a motion vector scaling unit 61B to scale the motion vector. The interpolation block 62B of the second region is extracted from (m+1)-th frame memory 32 using the scaled motion vector and output to the interpolation frame generation unit 63. The interpolation frame generation unit 63 assigns the interpolation block to the interpolation frame to generate image data of the interpolation frame.

(Twelfth Embodiment)

Figure 28:
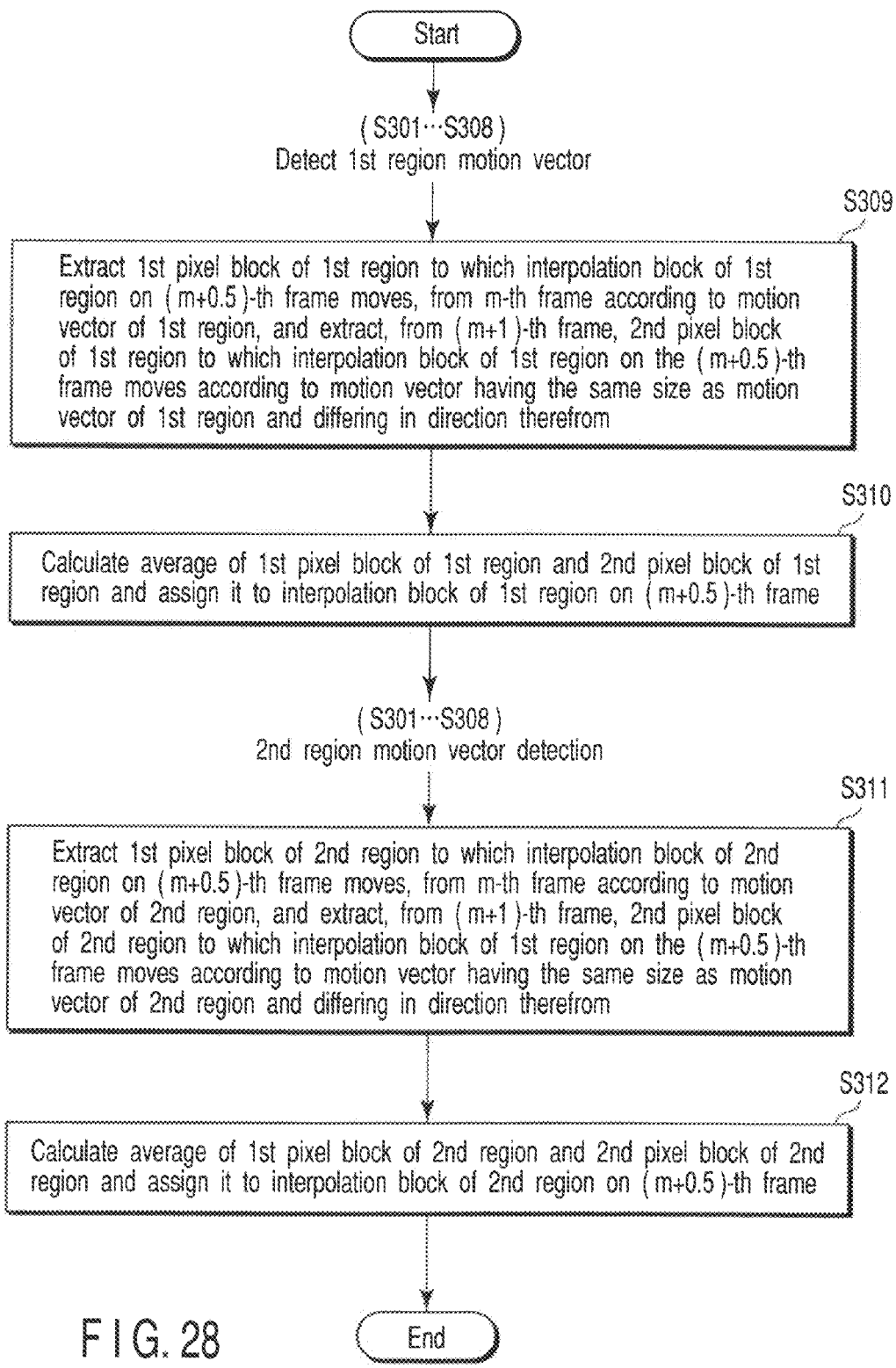
FIG. 28 is a flow chart showing region division and motion vector detection procedure according to the embodiment.

The twelfth embodiment that applies a method of detecting a motion vector to the third embodiment is explained referring to FIGS. 26 and 28. The parameters n and k of the third embodiment are expressed with n=1, k=0.5.

The vector detection method is executed using steps S301 to S308 in the third embodiment. The detected third motion vector becomes a motion vector e of the first region. In the present embodiment, the motion vector e of the first region becomes a motion vector between the m-th frame of the original picture image and the (m+0.5)-th frame of the interpolation image, so that the scaling of the vector is not necessary. The pixel blocks of the first region can be extracted from the m-th frame and the (m+1)-th frame (step S309).

The image data of pixels that are on the same spatial location in the pixel blocks of the first region are averaged. This average image data is calculated as image data of the interpolation block of the first region and assigned to the (m+0.5)-th frame (step S310). A motion vector of the second region is detected using the same method as the third embodiment, that is, steps S301 to S308.

By the same method as allocation of the interpolation block of the first region, extraction of the first and second pixel blocks of the second region (step S311), calculation of image data of the interpolation block of the second region and allocation of the interpolation block of the second region to the (m+0.5)-th frame are done (step S312).

The configuration of an apparatus executing the interpolation image forming method related to the present embodiment is shown in FIG. 30. Only a part added after motion vectors of the first and second regions are detected in accordance with the third embodiment is described.

The first pixel block of the first region is extracted from the m-th frame according to the motion vector of the first region. The second pixel block of the first region is extracted from the (m+1)-th frame according to a vector backward with respect to the motion vector of the first region. The first region interpolation block calculation unit 65 calculates an average of image data from the pixel blocks and outputs it to an interpolation frame generation unit 63.

Similarly, the first pixel block of the second region is extracted from the m-th frame according to the motion vector of the second region. The second pixel block of the second region is extracted from the (m+1)-th frame according to a vector backward with respect to the motion vector of the second region. The second region interpolation block calculation unit 66 calculates an average of image data from the pixel blocks and outputs it to the interpolation frame generation unit 63. The interpolation frame generation unit 73 assigns interpolation blocks to interpolation frames respectively and generate an interpolation frame.

The interpolation image ((m+0.5)-th frame) is obtained by the average of the pixel values of the m-th frame and (m+1)-th frame like statement above. However, with a conventional case of the (m+k)-th frame, m-th frame and (m+n)-th frame, this may be obtained by a weighted average of pixel value: k×(m-th frame)+(n−k)×((m+n)-th frame))/n (Thirteenth Embodiment)

There will be described as the thirteenth embodiment of the present invention an image display system using the motion vector detection method explained in the above embodiments and the interpolation image forming method related to the eleventh embodiment.

Figure 29:
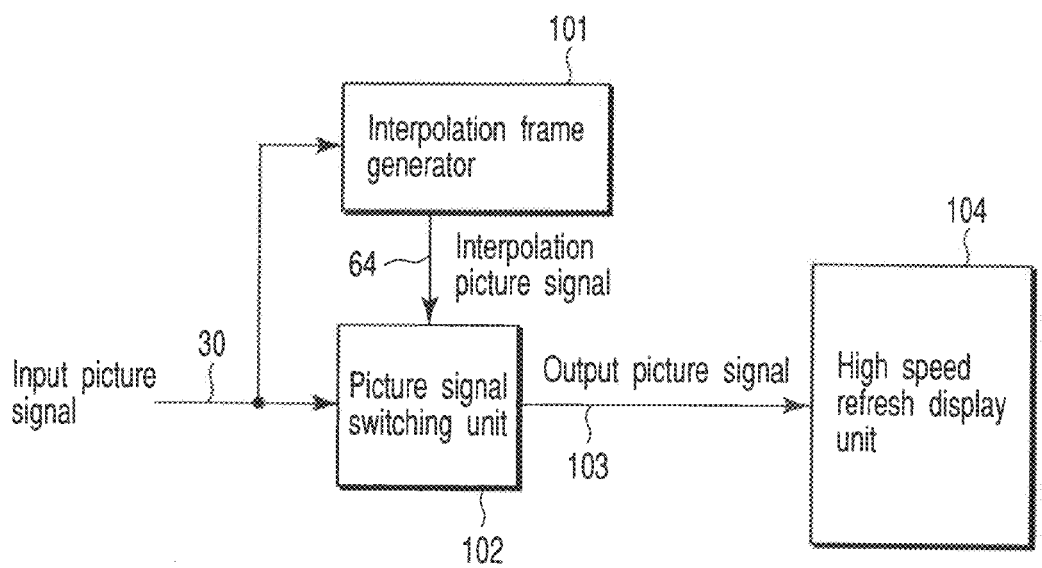
FIG. 29 is a block diagram showing a configuration of a display system according to the twelfth embodiment of the present invention.

FIG. 29 shows an outline configuration of the image display system wherein an input image signal 101 is input to an interpolation frame image forming unit 102 and an image switching unit 104. The interpolation frame image forming unit 102 makes the interpolation image signal 103 described in the eleventh embodiment, in accordance with the procedure described hereinbefore and outputs it to the image switching unit 104. The image switching unit 104 controls to output the input image signal 101 as it is or to output the interpolation picture signal 104. The output image signal 105 from the image switching unit 104 is output to a high speed refresh display unit 106 which is a hold type visual display unit. The display unit 106 displays an image changing a refresh rate according to a synchronizing signal included in the output image signal 105.

According to the present invention as described above, a motion vector can be precisely detected by a motion vector detection technique placed emphasis on shape of the image. Further, the motion vector can be detected for each of regions obtained by dividing a block. Therefore, the interpolation image including no block distortion and no interpolation error can be generated. A motion video can be played back as a realistic image. In the above embodiments, an absolute difference value of the pixels is used. However, an absolute square value may be used.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A motion vector detecting method comprising:
    (a) extracting, from a (m+k)-th frame assumed between a m-th frame (m indicates an integer) of an image formed of a plurality of pixels and a (m+n)-th frame (n is an integer not less than k+1, k is a real number), a plurality of first blocks produced by dividing the (m+k)-th frame and each having a given size and a give shape;
    (b) extracting a plurality of second blocks identical in size and shape to the first blocks from the m-th frame;
    (c) obtaining first motion vectors between the first blocks and the second blocks;
    (d) calculating second motion vectors which are $-(n-k)/k$ of the first motion vectors;
    (e) extracting, from the (m+n)-th frame, third blocks corresponding to destinations of the first blocks according to the second motion vectors;
    (f) obtaining each first absolute difference value between opposite pixels of the second blocks and the third blocks;
    (g) counting pixels having the first absolute difference value not more than a first threshold to obtain first count values
    (h) extracting a first pair of blocks each containing pixels for which the first count value is maximum from the second blocks and the third blocks to obtain a vector between the first pair of blocks as a motion vector for every first region between the m-th frame and the (m+n)-th frame;
    (i) extracting pixels in the second blocks for which the first absolute difference value is not more than a second threshold as pixels of the first region;
    (j) extracting pixels in the second block for which the first absolute difference value is more than a second threshold as pixel blocks of a second region;
    (k) extracting, from the (m+n)-th frame, a pixel block of a second spatial expansion region identical in size and shape to a first spatial expansion region connecting adjacent second regions in the second blocks spatially to each other;
    (l) obtaining each second absolute difference value between opposite pixels of the pixel blocks of the first spatial expansion region and the pixel blocks of the second spatial expansion region;
    (m) counting pixels having the second absolute difference value not more than a third threshold to obtain second count values; and
    (n) extracting a second pair of blocks each including pixels for which the second count value is maximum from the first spatial expansion region and the second spatial expansion region to obtain a vector between the second pair of blocks as a motion vector for every second region between the first spatial expansion region and the (m+n)-th frame.

2. A motion vector detecting apparatus comprising:
    an extractor (a) to extract, from a (m+k)-th frame assumed between a m-th frame (m indicates an integer) of an image formed of a plurality of pixels and a (m+n)-th frame (n is an integer not less than k+1, k is a real number), a plurality of first blocks produced by dividing the (m+k)-th frame and each having a given size and a give shape;
    an extractor (b) to extract a plurality of second blocks identical in size and shape to the first blocks from the m-th frame;
    an obtaining unit (c) to obtain first motion vectors between the first blocks and the second blocks;
    a calculator (d) to calculate second motion vectors which are $-(n-k)/k$ of the first motion vectors;
    an extractor (e) to extract, from the (m+n)-th frame, third blocks corresponding to destinations of the first blocks according to the second motion vectors;
    an obtaining unit (f) to obtain each first absolute difference value between opposite pixels of the second blocks and the third blocks;
    a counter (g) to count pixels having the first absolute difference value not more than a first threshold to obtain first count values
    an extractor (h) to extract a first pair of blocks each containing pixels for which the first count value is maximum from the second blocks and the third blocks to obtain a vector between the first pair of blocks as a motion vector for every first region between the m-th frame and the (m+n)-th frame;
    an extractor (i) to extract pixels in the second blocks for which the first absolute difference value is not more than a second threshold as pixels of the first region;
    an extractor (j) to extract pixels in the second block for which the first absolute difference value is more than a second threshold as a pixel block of a second region;
    an extractor (k) to extract, from the (m+n)-th frame, a pixel block of a second spatial expansion region identical in size and shape to a first spatial expansion region connecting adjacent second regions in the second blocks spatially to each other;
    an obtaining unit (l) to obtain each second absolute difference value between opposite pixels of the pixel blocks of the first spatial expansion region and the pixel blocks of the second spatial expansion region;
    a counter (m) to count pixels having the second absolute difference value not more than a third threshold to obtain second count values; and
    an extractor (n) to extract a second pair of blocks each including pixels for which the second count value is maximum from the first spatial expansion region and the second spatial expansion region to obtain a vector between the second pair of blocks as a motion vector for every second region between the first spatial expansion region and the (m+n)-th frame.

* * * * *